United States Patent
Lassalas et al.

(10) Patent No.: US 12,460,992 B1
(45) Date of Patent: Nov. 4, 2025

(54) METHODS OF MULTI-CORE FIBER ALIGNMENT

(71) Applicant: Alcon Inc., Fribourg (CH)

(72) Inventors: Bruno Lassalas, Foothill Ranch, CA (US); Ronald T. Smith, Irvine, CA (US); Chenguang Diao, Irvine, CA (US); Alireza Mirsepassi, Irvine, CA (US)

(73) Assignee: Alcon Inc., Fribourg (CH)

( * ) Notice: Subject to any disclaimer, the term of this patent is extended or adjusted under 35 U.S.C. 154(b) by 505 days.

(21) Appl. No.: 17/930,797

(22) Filed: Sep. 9, 2022

Related U.S. Application Data

(60) Provisional application No. 63/249,111, filed on Sep. 28, 2021.

(51) Int. Cl.
| | |
|---|---|
| *G01M 11/00* | (2006.01) |
| *A61F 9/008* | (2006.01) |
| *A61B 18/20* | (2006.01) |
| *A61B 18/22* | (2006.01) |
| *A61B 90/00* | (2016.01) |
| *G02B 6/02* | (2006.01) |

(52) U.S. Cl.
CPC ......... *G01M 11/31* (2013.01); *A61F 9/00823* (2013.01); *A61B 2018/2025* (2013.01); *A61B 2018/2205* (2013.01); *A61B 2018/2283* (2013.01); *A61B 2090/373* (2016.02); *A61F 2009/00863* (2013.01); *G02B 6/02042* (2013.01)

(58) Field of Classification Search
CPC ....... A61F 9/00823; A61F 2009/00863; A61B 2018/2025; A61B 2018/2205; A61B 2018/2283; A61B 2090/373; G01M 11/31
See application file for complete search history.

(56) References Cited

U.S. PATENT DOCUMENTS

| | | | | |
|---|---|---|---|---|
| 5,559,909 | A | * | 9/1996 | Anderson ............ G02B 6/3504 385/23 |
| 6,096,028 | A | | 8/2000 | Bahmanyar |
| 6,585,726 | B2 | | 7/2003 | Frey et al. |
| 7,566,173 | B2 | | 7/2009 | Auld et al. |
| 8,561,280 | B2 | | 10/2013 | Diao et al. |
| 8,837,883 | B2 | | 9/2014 | Lassalas |
| 8,951,244 | B2 | | 2/2015 | Smith |
| 9,910,338 | B2 | | 3/2018 | Smith |
| 10,245,181 | B2 | | 4/2019 | Diao |
| 10,639,198 | B2 | | 5/2020 | Farley |
| 10,795,067 | B2 | * | 10/2020 | Otsuka ..................... G02B 6/04 |
| 11,006,822 | B2 | | 5/2021 | Dos Santos et al. |
| 11,109,938 | B2 | | 9/2021 | Horn et al. |
| 11,160,686 | B2 | | 11/2021 | Cook et al. |
| 11,432,963 | B2 | | 9/2022 | Lassalas et al. |
| 11,448,854 | B2 | | 9/2022 | Honaryar et al. |
| 11,493,692 | B2 | | 11/2022 | Diao et al. |
| 2018/0038769 | A1 | * | 2/2018 | Hayashi ............. G01M 11/3109 |
| 2018/0172920 | A1 | * | 6/2018 | Froggatt ............ G02B 6/02042 |
| 2019/0175406 | A1 | * | 6/2019 | Cook ..................... B05C 1/027 |

(Continued)

*Primary Examiner* — Michael P LaPage

(57) ABSTRACT

Particular embodiments disclosed herein provide methods and systems for aligning multi-core fibers with multi-spot laser beam patterns of laser surgical systems. In particular, certain aspects provide techniques for aligning a rotational angle, or "clocking" angle, of a multi-core fiber with a fixed multi-spot laser beam pattern of a laser system utilizing digital imaging and analysis.

19 Claims, 14 Drawing Sheets

(56) References Cited

U.S. PATENT DOCUMENTS

| | | | |
|---|---|---|---|
| 2019/0175407 A1* | 6/2019 | Bacher | A61B 18/22 |
| 2020/0390603 A1 | 12/2020 | Diao et al. | |
| 2020/0397614 A1 | 12/2020 | Diao et al. | |
| 2021/0267695 A1* | 9/2021 | Hazelton | A61B 1/012 |
| 2022/0110793 A1 | 4/2022 | Sawicz et al. | |
| 2022/0365282 A1* | 11/2022 | Yamashita | G02B 6/3861 |
| 2024/0272360 A1* | 8/2024 | Morishima | G02B 6/024 |

* cited by examiner

METHODS OF MULTI-CORE FIBER ALIGNMENT

PRIORITY CLAIM

This application claims the benefit of priority of U.S. Provisional Patent Application Ser. No. 63/249,111 titled "MULTI-CORE FIBER ALIGNMENT," filed on Sep. 28, 2021, whose inventors are Bruno Lassalas, Ronald T. Smith, Chenguang Diao and Alireza Mirsepassi, which is hereby incorporated by reference in its entirety as though fully and completely set forth herein.

FIELD

The present disclosure relates generally to systems and methods for aligning components of surgical laser systems, and more specifically, to systems and methods for aligning multi-core fibers with multi-spot laser beam patterns of surgical laser systems.

BACKGROUND

In a wide variety of medical procedures, laser light (e.g., laser treatment beam ("treatment beam"), laser aiming beam ("aiming beam"), etc.) is used to assist in surgery and/or treat patient anatomy. For example, in laser photocoagulation, a laser probe propagates a laser treatment beam to cauterize blood vessels at a burn spot across the retina. A laser treatment beam is typically transmitted from a surgical laser system through an optical fiber that proximally terminates in a port adapter, which connects to the surgical laser system, and distally terminates in the laser probe, which is manipulated by a surgeon. Note that, herein, a distal end of a component refers to the end that is closer to a patient's body while the proximal end of the component refers to the end that is facing away from the patient's body or is in proximity to, for example, the surgical laser system.

In addition to cauterizing blood vessels at the burn spot, the treatment beam may also damage some of the rods and cones that are present in the retina that provide vision, thereby, affecting eyesight. Since vision is most acute at the central macula of the retina, the surgeon arranges the laser probe to generate a burn spot in the peripheral areas of the retina. During the procedure, the surgeon drives the probe with a non-burning aiming beam to illuminate the retinal area that is to be photocoagulated. Due to the availability of low-power red laser diodes, the aiming beam is generally a low-power red laser light. Once the surgeon has positioned the laser probe so as to illuminate a desired retinal spot with the aiming beam, the surgeon activates the laser treatment beam through a foot pedal or other means to photocoagulate the illuminated area (e.g., or an area encompassing the illuminated area) using the laser treatment beam. Having burned a retinal spot, the surgeon repositions the probe to illuminate a new spot with the aiming light, activates the laser treatment beam to photocoagulate the new spot, repositions the probe, and so on until a desired number of burned laser spots are distributed across the retina.

Certain types of laser probes coagulate or burn multiple spots at a time, which may result in a faster and more efficient photocoagulation. For example, a surgical laser system that is coupled to one of such laser probes through an optical fiber may be configured to split a single laser beam into multiple laser beams that exhibit a multi-spot laser pattern. In such an example, the surgical laser system transmits the multiple laser beams onto a proximal interface plane of the optical cable, which may include an array of multiple optical fibers or a multi-core fiber that exhibit a corresponding fiber pattern.

When utilizing a multi-spot laser system with a multi-core optical fiber, it is imperative to have each spot of a transmitted multi-spot laser beam aligned with a core of the multi-core optical fiber on the proximal interface plane of the fiber. Even a slight misalignment between the laser spots and fiber cores may cause decreased coupling efficiency of the laser spots into the fiber cores, thus decreasing the power uniformity of the multiple laser beams transmitted through the multi-core fiber. However, current alignment methods are severely limited due to issues with high tolerances, which can result in multiple-degree angular misalignments of the laser spots and fiber cores and thus, decreased performance of the laser probe.

Therefore, there is a need for improved systems and methods for aligning multi-core fibers with multi-spot laser beam patterns that address the drawbacks described above.

SUMMARY

The present disclosure relates generally to methods and systems for aligning components of surgical laser systems, and more specifically, to methods and systems for aligning multi-core fibers with multi-spot laser beam patterns.

Certain embodiments of the present disclosure provide a method of aligning a multi-core fiber of a laser device, the method comprising: projecting a laser beam corresponding to a multi-spot laser beam pattern from a laser source onto a sensor; projecting a light beam corresponding to a multi-core pattern of the multi-core fiber onto the sensor; identifying a rotational misalignment between the multi-spot laser beam pattern and the multi-core pattern; and rotating the multi-core fiber based on the determined rotational misalignment to align the multi-spot laser beam pattern and the multi-core pattern.

Certain embodiments of the present disclosure provide a method of aligning a multi-core fiber with a multi-spot laser source of a device, comprising: transmitting a laser beam from the multi-spot laser source through a diffractive optical element to form a multi-spot laser beam; deflecting the multi-spot laser beam onto a proximal endface of the multi-core fiber; reflecting a first portion of the multi-spot laser beam from the proximal endface of the multi-core fiber, the reflected first portion forming a multi-spot laser beam pattern corresponding to the multi-spot laser beam; reflecting a second portion of the multi-spot laser beam from a distal endface of the multi-core fiber, the reflected second portion forming a multi-core pattern corresponding to the cores of the multi-core fiber; transmitting the multi-spot laser beam pattern and the multi-core pattern to a sensor; identifying a rotational misalignment between the multi-spot laser beam pattern and the multi-core pattern; determining a degree of rotation of the multi-core fiber to align the multi-spot laser beam pattern and the multi-core pattern; and rotating the multi-core fiber to rotationally align the multi-spot laser beam pattern and the multi-core pattern.

The following description and the related drawings set forth in detail certain illustrative features of one or more embodiments, including those described above.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

In the following description, details are set forth by way of example to facilitate an understanding of the disclosed subject matter. It should be apparent to a person of ordinary skill in the field, however, that the disclosed implementations are exemplary and not exhaustive of all possible implementations. Thus, it should be understood that reference to the described examples is not intended to limit the scope of the disclosure. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Note that, as described herein, a distal end, segment, or portion of a component refers to the end, segment, or portion that is closer to a patient's body during use thereof. On the other hand, a proximal end, segment, or portion of the component refers to the end, segment, or portion that is distanced further away from the patient's body is in proximity to, for example, a surgical laser system.

As used herein, the term "about" may refer to a +/−10% variation from the nominal value. It is to be understood that such a variation can be included in any value provided herein.

Particular embodiments disclosed herein provide methods and systems for aligning multi-core fibers with multi-spot laser beam patterns of laser surgical systems. In particular, certain aspects provide techniques for aligning a translational (X, Y) position, as well as a rotational angle, or "clocking" angle, of a multi-core fiber with a multi-spot laser beam pattern of a laser system utilizing digital imaging and analysis. The methods and systems described herein may be utilized in combination with any suitable laser surgical systems, such as those described below.

Example Surgical Laser System

Figure 1:
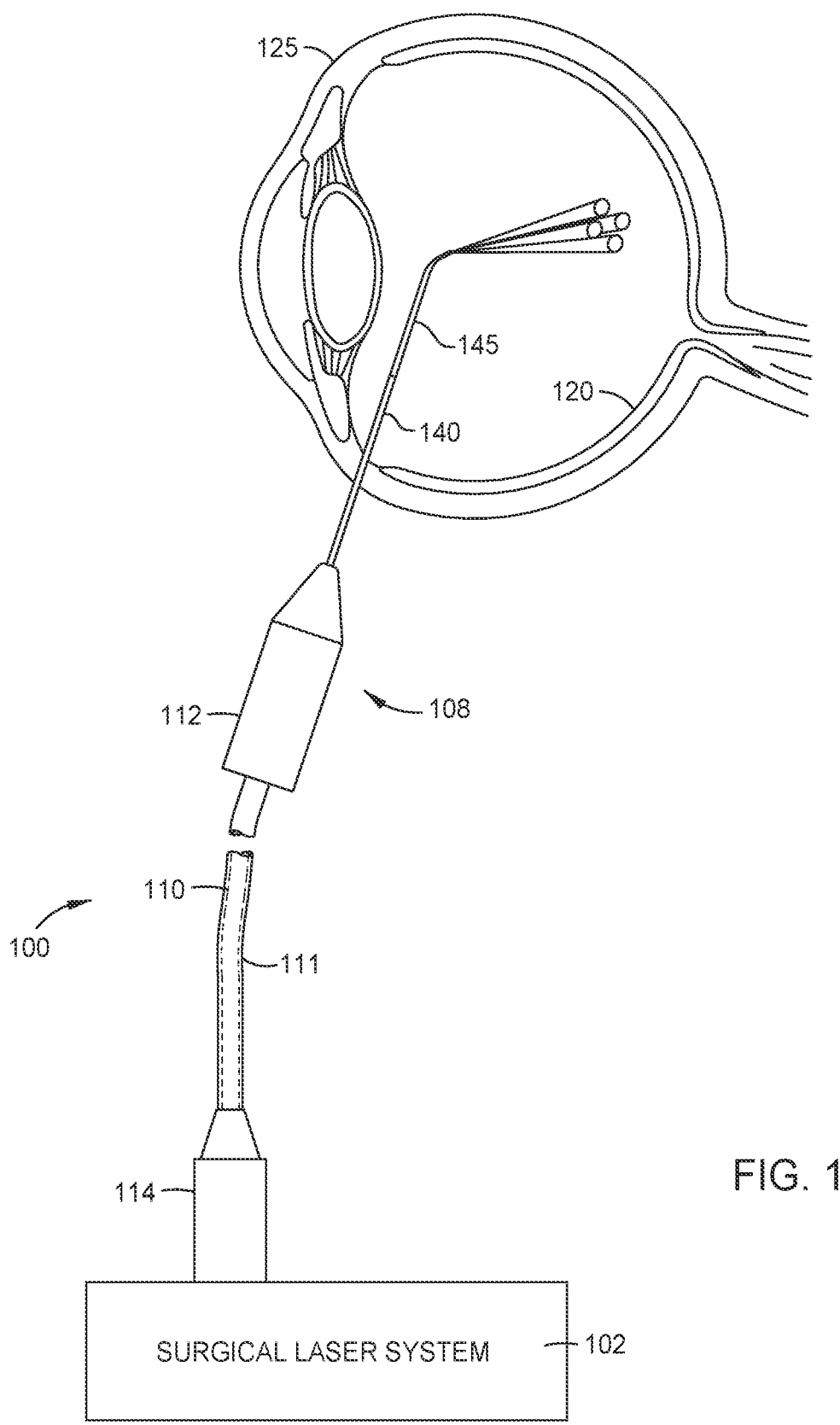
FIG. 1 illustrates a plan view of a system for generating laser beams for delivery to a surgical target, in accordance with certain embodiments of the present disclosure.

FIG. 1 illustrates an example system 100 for performing a laser-assisted ophthalmic procedure. System 100 includes a surgical laser system 102 having one or more laser sources for generating laser beams. For example, a first laser source within surgical laser system 102 may generate a treatment beam with a first wavelength (e.g., ~532 nanometers (nm)) while a second laser source may generate an aiming beam with a second wavelength (e.g., ~635 nm). A user, such as a surgeon, may first trigger the surgical laser system 102 (e.g., via a foot switch, voice commands, etc.) to emit the aiming beam onto a desired retinal spot. Once the surgeon has positioned the laser probe so as to illuminate the desired retinal spot with the aiming beam, the surgeon activates the treatment beam, such as through a foot pedal or other means, to treat patient anatomy (e.g., photocoagulate the desired retinal spot using the treatment beam).

As shown, surgical laser system 102 includes a connector or port adapter 114 that couples to an optical port of surgical laser system 102. FIG. 1 also shows an optical fiber 110 inside an optical fiber cable 111 having a distal end that couples to and extends through a probe 108 and a proximal end that couples to and extends through port adapter 114. In some cases, as further described herein, the optical fiber 110 may include more than one fiber. In the example of FIG. 1, port adapter 114 includes a ferrule with an opening in which the proximal end of optical fiber 110 is inserted. The proximal end of optical fiber 110 includes an interface plane (also referred to as a proximal entrance plane) upon which laser beams from surgical laser system 102 may be focused when the proximal end of optical fiber 110 is inserted into the ferrule. The interface plane of optical fiber 110 comprises the exposed proximal ends of the one or more cores where laser beams may be directed to. In the example of FIG. 1, optical fiber 110 is a multi-core optical fiber (MCF) with four cores. As such, the interface plane of the proximal end of optical fiber 110 comprises the proximal ends of the four cores upon which laser beams may be focused.

Surgical laser system 102 may be configured to split a single laser beam that is generated by a laser source into multiple laser beams that exhibit a laser spot pattern. For example, surgical laser system 102 may split an aiming beam into four aiming beams and then deliver the four aiming beams to the interface plane of optical fiber 110 through the opening of the ferrule of port adapter 114. Surgical laser system 102 may further be configured to split the treatment beam into four treatment beams and deliver the four treatment beams to the interface plane of optical fiber 110 through the opening of the ferrule. In such an example, each of the cores of optical fiber 110 would then be transmitting a multi-wavelength or combined beam, which may refer to a treatment beam combined with an aiming beam. Though certain aspects are described with respect to the cores of the optical fiber transmitting a combined beam, it should be noted that the cores of optical fiber 110 can also individually transmit either the treatment beam or the aiming beam, depending on which beam(s) are activated and incident on the optical fiber 110.

In some examples, surgical laser system 102 may also propagate an illumination beam into an interface plane of optical fiber 110 (e.g., which may also include a proximal end of a cladding that holds the cores within optical fiber 110) in order to illuminate the inside of the eye, especially areas of the retina 120 that are to be photocoagulated. In certain aspects, an illumination beam may be generated by a white light-emitting diode (LED).

Optical fiber 110 delivers the combined beams to probe 108, which propagates a multi-spot pattern (e.g., four spots) of combined beams to the retina 120 of a patient's eye 125. Probe 108 includes a probe body 112 and a probe tip 140 that house and protect the distal end of optical fiber 110. A distal end portion 145 of the probe tip 140 may also contain a lens that focuses the combined beams on the retina 120.

Figure 2:
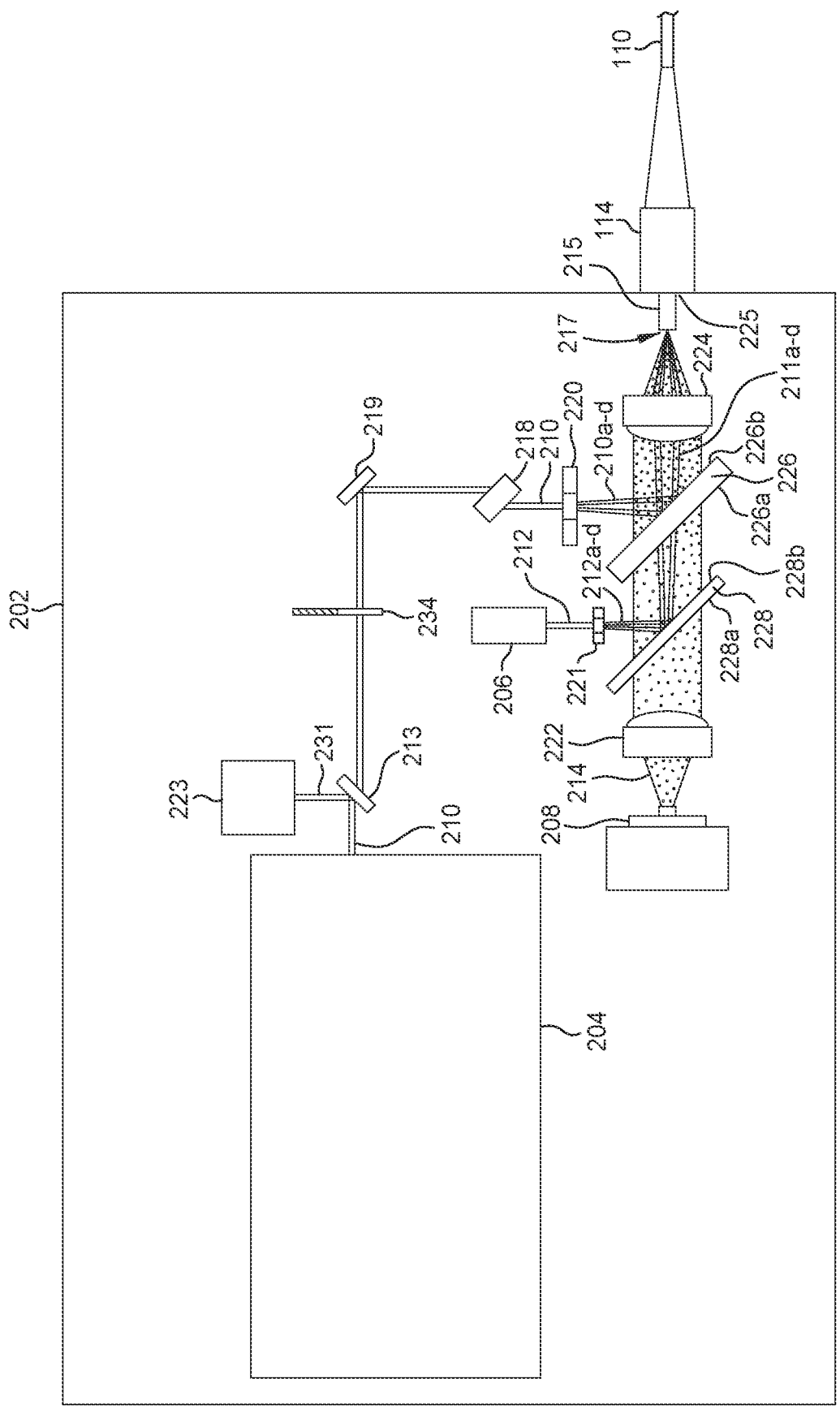
FIG. 2 illustrates an example of a surgical laser system, and the components therein, in accordance with certain embodiments of the present disclosure.

FIG. 2 illustrates an example surgical laser system 202, and the components therein, that may be implemented according to embodiments described herein. Surgical laser system 202 comprises a laser source 204, which propagates a treatment beam 210, laser source 206, which propagates an aiming beam 212, and a light source 208, which propagates an illumination beam 214. Surgical laser system 202 further includes a plurality of lenses, diffractive elements, beam splitters, and other optical relay devices for relaying the laser and illumination beams between their respective sources and desired ports, which may together be referred to as an "optical relay system."

At the outset of the surgery, a surgeon may activate light source 208 in order to illuminate the inside of the eye's globe and make it easier to view the retina. As shown, once emitted by light source 208, illumination beam 214 (stippled segment) is received by collimating lens 222, which is configured to produce a beam with parallel rays of light. In certain embodiments, collimating lens 222 may be a multi-element achromat comprising two singlet lenses and one doublet lens. Therefore, as shown, illumination beam 214 emerges with parallel rays of light from the other side of collimating lens 222 and passes through beam splitters 228 and 226 (which may also be referred to as dichroic mirrors), respectively, to reach a condensing lens 224. In certain embodiments, condensing lens 224 may be a multi-element achromat comprising two singlet lenses and one doublet lens. In such embodiments, condensing lens 224 has the same design as collimating lens 222, except that the assembly is reversed (e.g., rotated by 180 degrees), thereby creating a one-to-one magnification imaging system. Each of beam splitters 228 and 226 may have different coatings on their two sides, 228a and 228b, and 226a and 226b, respectively. For example, sides 228a and 226a are coated such that they allow light propagated thereon to pass through beam splitters 228 and 226. As such, illumination beam 214, which is propagated onto sides 228a and 226a passes beam splitters 228 and 226. On the other hand, sides 228b and 226b are coated to reflect light or laser beams such as aiming beam 212 and treatment beam 210, respectively, as further described below.

Condensing lens 224 then converges illumination beam 214 into an interface plane of a proximal end of an optical fiber, such as optical fiber 110, which is coupled to port 225 of surgical laser system 202 through port adapter 114. As described in relation to FIG. 1, optical fiber 110 may have four cores embedded within a larger-diameter cladding. As such, condensing lens 224 focuses illumination beam 214 into an interface plane of optical fiber 110 such that illumination beam 214 is propagated, along an entire length of the cladding and each of the four cores of optical fiber 110, to the distal end of a surgical probe (e.g., probe 108 of FIG. 1) that is coupled to optical fiber 110. As described above, the interface plane of optical fiber 110 comprises the proximal ends of the four cores and cladding thereof that are exposed through opening 217 of port adapter 114, respectively, via ferrule 215.

Once the surgeon is able to view inside the eye's globe, the surgeon may project from the distal end of the probe one or more desired aiming beam spots onto the retina. More specifically, after activation by the surgeon, laser source 206 emits aiming beam 212, e.g., a red laser beam, onto diffraction optical element (DOE) 221. A diffraction segment may also be referred to as a "segment" herein. In the example of FIG. 2, DOE 221 is positioned such that aiming beam 212 is aligned with the middle segment of DOE 221, which diffracts aiming beam 212 into aiming beams 212a-d (e.g., four aiming beams). However, a surgeon may change the position of DOE 221 in order to diffract a beam into a different number of beams (e.g., 2 or 1). For example, using voice command or some other feature of surgical laser system 202, a surgeon may position DOE 221 to align aiming beam 212 with a different segment of DOE 221, which may diffract aiming beam 212 into two or one or other numbers of beams.

Once diffracted, the resulting aiming beams are reflected by beam splitter 228 through beam splitter 226 and onto condensing lens 224. In examples where aiming beams 212a-d are red aiming beams, beam splitter 228 may be a red dichroic optical element, and aiming beams 212a-d may reflect off of a narrowband red spectral notch in beam splitter 228. Condensing lens 224 then focuses the four aiming beams onto the interface plane of a proximal end of optical fiber 110 such that each of the aiming beams is propagated, along an entire length of a corresponding core of optical fiber 110, to the distal end of a surgical probe (e.g., probe 108 of FIG. 1). Each of the four aiming beams focuses with high coupling efficiency into the corresponding core within the 4-core MCF, and propagated down the length of the core to the distal end of the MCF. This allows the surgeon to project from the distal end of the probe four desired aiming beam spots onto the retina.

As described above, once the surgeon has positioned and activated the laser probe so as to project aiming beam spots onto the retina, the surgeon activates laser source 204, such as through a foot pedal or other means, to treat patient anatomy (e.g., photocoagulate the desired retinal spot using the treatment beam). When activated, laser source 204 emits treatment beam 210, e.g., a green laser beam, as shown in FIG. 2. The treatment beam 210 reaches beam splitter 213, which is configured to allow a substantial portion of treatment beam 210 to pass through, while reflecting a trivial portion 231 onto sensor 223. Sensor 223 is a light sensor configured to detect whether laser source 204 is active or not and to monitor the treatment beam power. After passing through beam splitter 213 and provided that the shutter 234 is in an open position to permit the treatment beam 210, treatment beam 210 is received at fixed fold mirror 219, which is configured to reflect treatment beam 210 onto beam splitter 218.

In certain embodiments, the surgical laser system may also include a shutter 234 arranged between the laser source 204 and the fixed fold mirror 219. The shutter 234, may be configured to alternatively block or permit the treatment laser beam 210 from reaching the fixed fold mirror 219. A surgeon or surgical staff member can control the shutter 234

(e.g., via a foot switch, voice commands, etc.) to emit the laser aiming beam and fire the treatment laser beam (i.e., open the shutter 234) to treat patient anatomy (e.g., photocoagulation). In each case, the beam splitter 218 may direct the laser beams towards the port adapter 114.

As shown, the treatment beam 210 passes through beam splitter 218 before reaching DOE 220. DOE 220, similar to DOE 221, then diffracts treatment beam 210 into treatment beams 210a-210d (e.g., four treatment beams). However, a surgeon may change the position of DOE 220 in order to diffract a beam into a different number of beams (e.g., 2 or 1). For example, using voice command or some other feature of surgical laser system 202, a surgeon may position DOE 220 to align treatment beam 210 with a different segment of DOE 220, which may diffract treatment beam 210 into two or one or other numbers of beams. Treatment beams 210a-210d are then received at beam splitter 226, which reflects treatment beams 210a-210d onto condensing lens 224. In examples where treatment beams 210a-d are green treatment beams, beam splitter 226 may be a green dichroic optical element, and treatment beams 210a-d may reflect off of a narrowband green spectral notch in beam splitter 226. Treatment beams 210a-d are reflected by beam splitter 226 at an angle with respect to beam splitter 226 that is equal to the angle with which aiming beams 212a-d are passed through beam splitter 226. Therefore, when laser source 204 is active, transmitted treatment beams 210a-d and aiming beams 212a-d are combined (e.g., such that they overlay each other) creating combined beams 211a-d), before reaching condensing lens 224.

Condensing lens 224 focuses combined beams 211a-211d onto an interface plane of the proximal end of optical fiber 110 such that each of the combined beams 211a-211d is propagated, along an entire length of a corresponding core of optical fiber 110, to the distal end of a surgical probe (e.g., probe 108 of FIG. 1). More specifically, in the example of FIG. 2, optical fiber 110 is an MCF with four cores, such as cores A, B, C, and D. In such an example, condensing lens 224 focuses combined beams 211a-211d onto an interface plane of a proximal end of optical fiber 110 such that, for example, combined beam 211a is propagated onto core A, combined beam 211b is propagated onto core B, combined beam 211c is propagated onto core C, and combined beam 211d is propagated onto core D.

Example Laser-to-Fiber Alignment Systems and Methods

Currently, alignment of multi-core optical fibers with laser systems may be accomplished utilizing physical features, e.g., mating features such as grooves, threads, ribs, and the like, pre-formed on the port adapter and/or ferrule which are aligned during installation of the optical fiber. In other examples, alignment of multi-core optical fibers may further include empirically calculating an alignment angle based on a prohibited power "valley" of the fiber, or rotating, i.e., "clocking," the multi-core optical fiber until a coupling efficiency between a single spot and fiber core is optimized. These methods, however, are severely limited due to the high tolerances of the components of the laser systems, which may lead to unacceptably low coupling efficiency of laser spots into the fiber cores and increased power non-uniformity between the multiple laser beams transmitted through the cores.

Accordingly, aspects of the present disclosure provide methods and systems for aligning multi-core fibers with multi-spot laser beam patterns of laser surgical systems. In particular, certain aspects provide techniques for aligning a translational (X, Y) position, as well as a rotational angle, or "clocking" angle, of a multi-core fiber with a fixed multi-spot laser beam pattern of a laser system utilizing digital imaging and analysis. The methods and systems described herein may be utilized in combination with any suitable laser surgical systems, such as those described with reference to FIGS. 1-2. Further, the methods and systems described herein may be utilized for alignment of both aiming and treatment laser beam patterns in laser surgical systems.

Generally, embodiments of the present disclosure provide several advantages over conventional methods for aligning multi-core optical fibers with laser systems. For example, certain embodiments described herein provide direct visualization of actual alignment between a multi-spot laser beam pattern of a surgical laser system and a multi-core pattern of a multi-core optical fiber, in real-time, as the optical fiber is being clocked or one or more optical devices (e.g., lenses, mirrors, diffraction optics, etc.) of the surgical laser system are being adjusted. Further, certain embodiments described herein provide direct visual feedback of potential lateral shifts between the multi-spot laser beam pattern and the multi-core pattern caused by small changes in tilt/orientation of optical devices during fixation (e.g., soldering) in the surgical laser system, thus providing a user the opportunity to re-adjust and re-fix (e.g., re-melt and re-harden the solder) the optical device(s), and in certain examples, over-compensate alignment angles for such small changes during fixation. Still further, certain embodiments described herein provide information regarding the shapes and sizes of laser beam spots and optical fiber cores, inter-spot and inter-core separations, relative intensity differences between laser beams and/or cores, and spurious scattered-light and diffracted light effects, in a single image. Accordingly, the methods and systems described herein also facilitate improved troubleshooting of surgical laser systems that have seen environmental exposure and no longer have good coupling efficiency or inter-spot power uniformity.

Figure 3A:
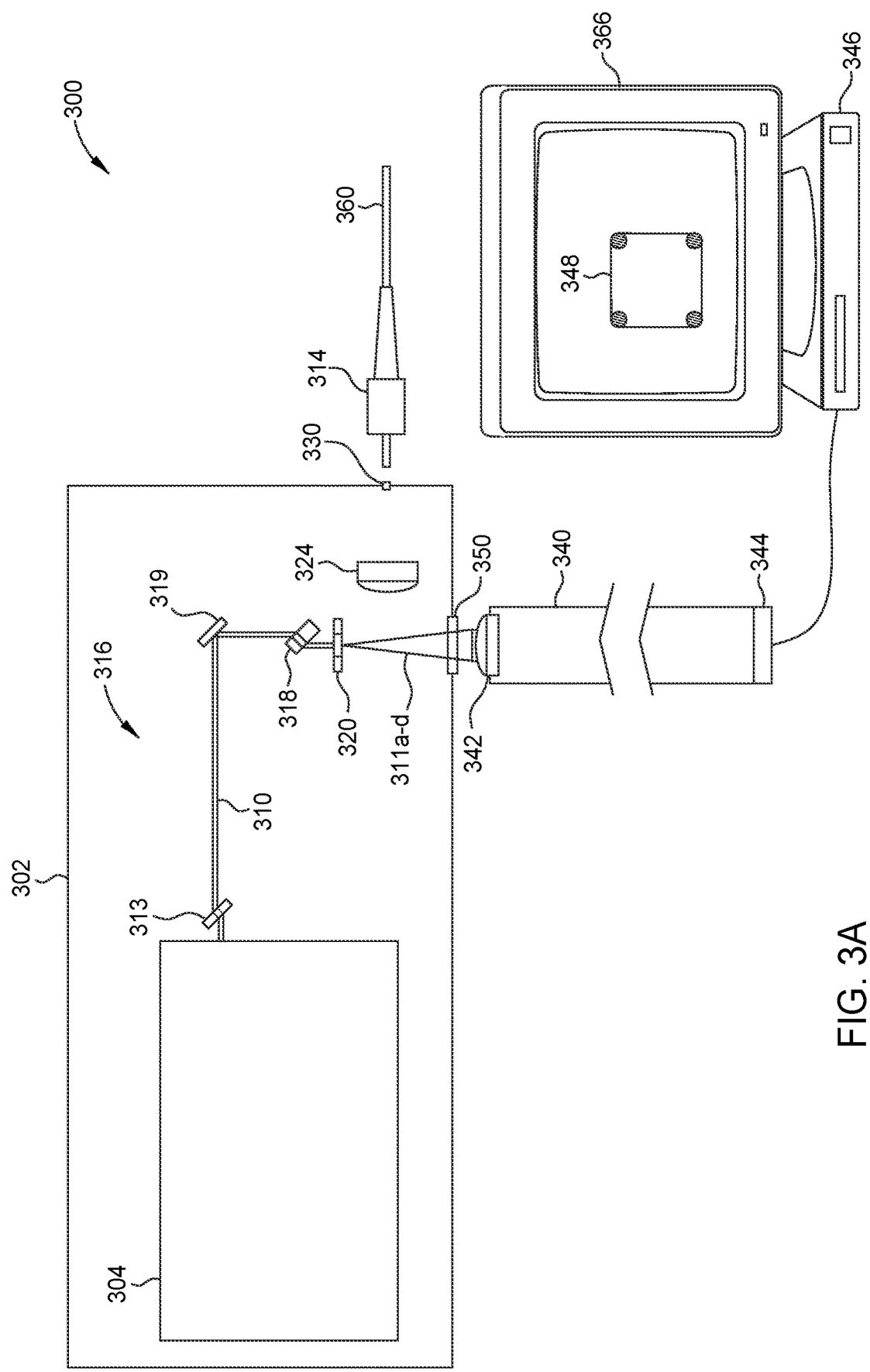
FIGS. 3A-3B illustrate a fiber alignment system for a surgical laser system, in accordance with certain embodiments of the present disclosure.
Figure 3B:
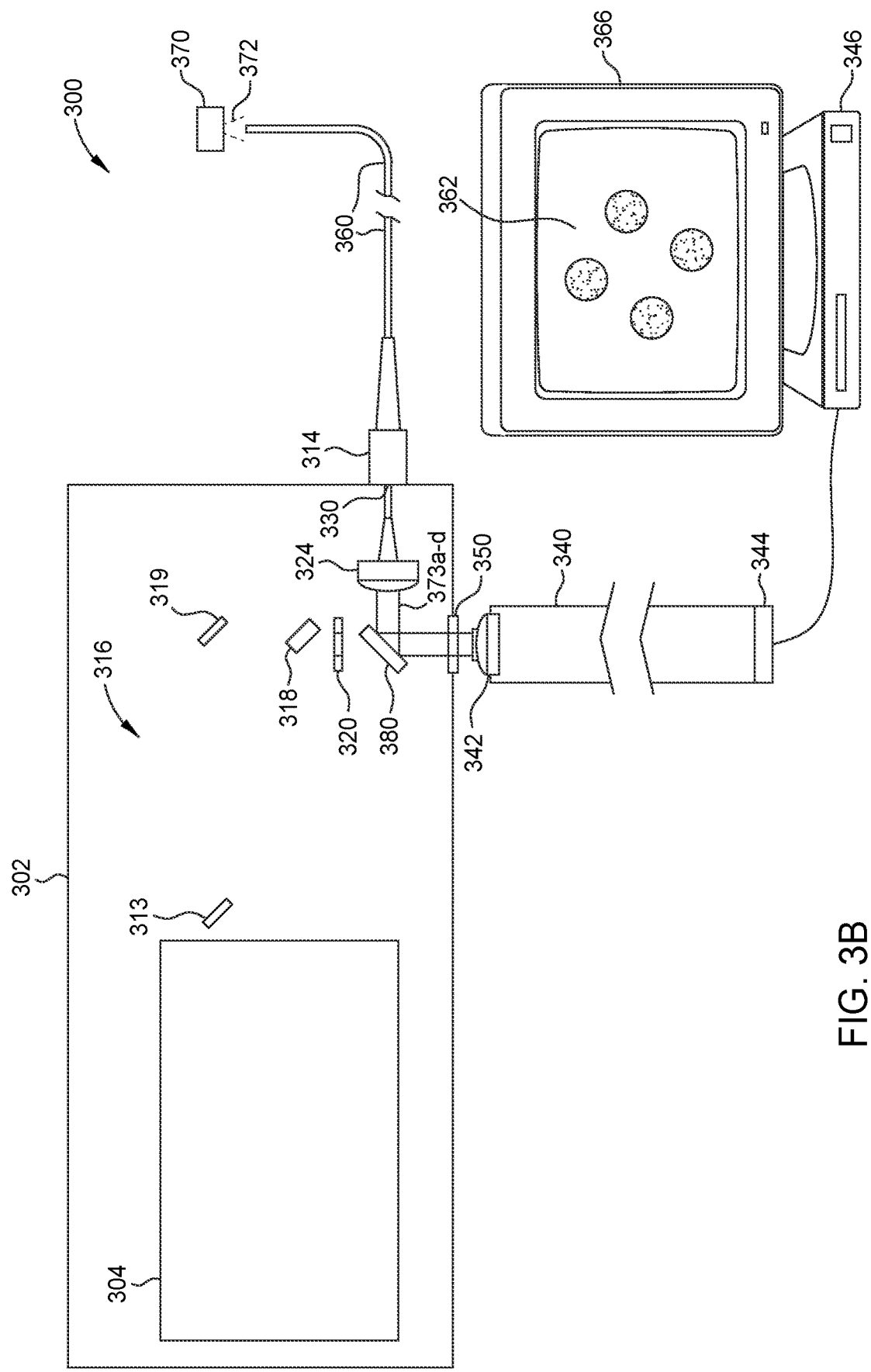
Figure 4:
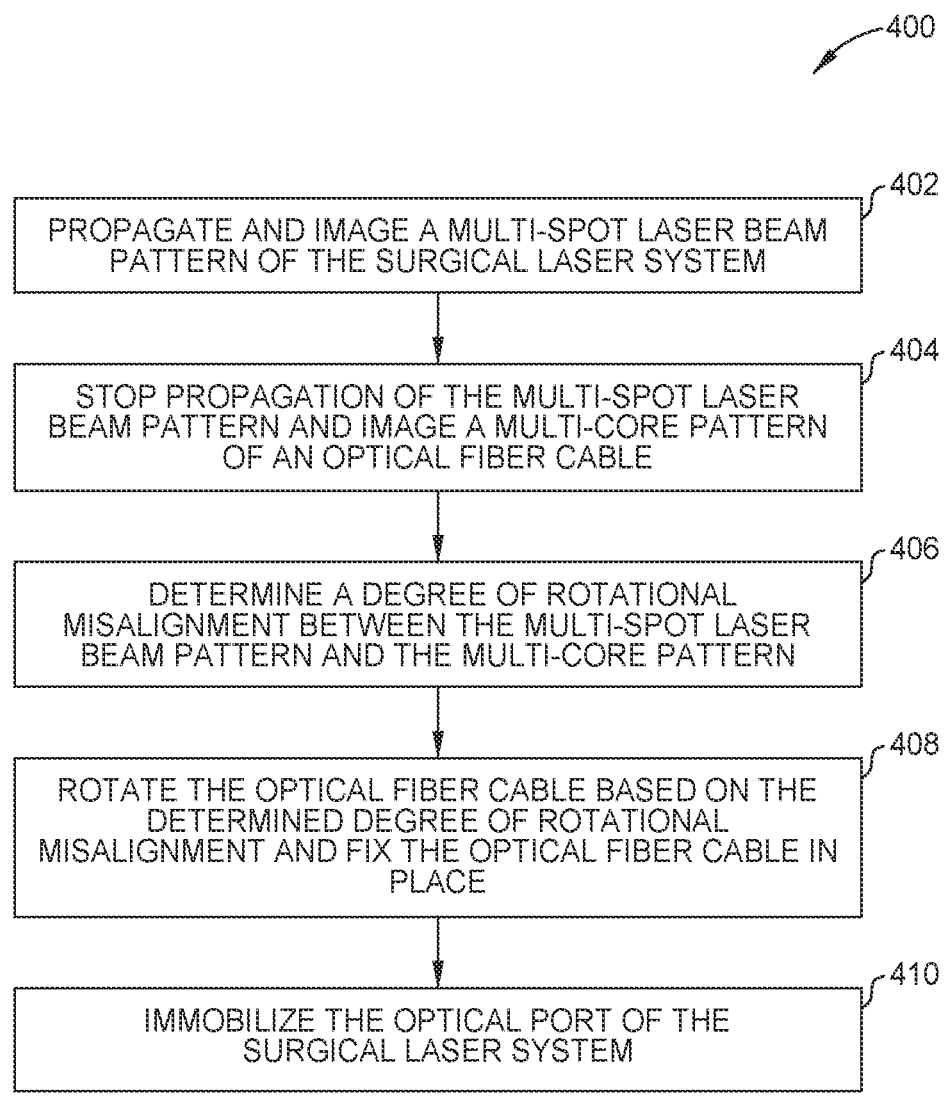
FIG. 4 illustrates a fiber alignment method using the fiber alignment system of FIGS. 3A-3B, in accordance with certain embodiments of the present disclosure.

FIGS. 3A-3B illustrate a first fiber alignment system 300 for a surgical laser system 302, in accordance with certain embodiments of the present disclosure. FIG. 4 illustrates a flow diagram of an optical fiber alignment method 400 utilizing fiber alignment system 300, in accordance with certain embodiments of the present disclosure. Accordingly, FIGS. 3A-3B and FIG. 4 are herein described together for clarity.

Note that surgical laser system 302 is only exemplary and may be representative of any suitable surgical laser system, including surgical laser systems 102 and 202. For purposes of clarity, only a select few exemplary components of surgical laser system 302 are illustrated and described herein.

Surgical laser system 302 generally includes laser source 304, which propagates laser beam 310 having a single-spot pattern (e.g., a single beam), and optical relay system 316, which can relay and manipulate laser beam 310 into a desired multi-spot laser beam pattern (i.e., into multiple laser beams). In certain embodiments, laser beam 310 may be utilized as a treatment beam, e.g., a green laser beam, and/or an aiming beam, e.g., a red laser beam. In certain embodiments, an aiming beam (e.g., a red laser beam) is pre-aligned with a treatment beam (e.g., a green laser beam), after which the alignment methods described below are performed with the treatment beam. In certain embodiments, for purposes of alignment, laser beam 310 is a 532 nm green laser beam. Optical relay system 316 relays laser beam 310 through the surgical laser system 302 and consists of a plurality of optical relay devices, including but not limited to beam splitters 313 and 318, fixed fold mirror 319, diffraction optical element (DOE) 320, and condensing lens 324. In certain examples, optical relay system 316 may include more or less optical relay devices, or different optical relay devices, such as those illustrated in FIG. 2.

As shown, surgical laser system 302 further includes an optical port 330 positioned adjacent to condensing lens 324. A proximal end of an optical fiber 360 may be coupled to the optical port 330 via port adapter 314. In certain embodiments, optical port 330 and condensing lens 324 may be referred to as a "chimney," which is clockable, e.g., rotatable, in order to rotationally align or "clock" optical fiber 360 with respect to surgical laser system 302. Optical fiber 360 includes a distal end that may attach to and extend through a surgical probe. Furthermore, optical fiber 360 may be disposed within a cable, such as cable 111 depicted in FIG. 1. In certain embodiments, port adapter 314 includes a ferrule with an opening that allows laser beam(s) from surgical laser system 302 to be propagated into an interface plane of the proximal end of optical fiber 360. The proximal interface plane of optical fiber 360 comprises exposed proximal ends of one or more cores where the laser beams may be directed to. In the example of FIGS. 3A-3B, optical fiber 360 is a multi-core optical fiber (MCF) with four cores. Accordingly, the interface plane of the proximal end of optical fiber 360 comprises the proximal ends of the four cores that are exposed through the opening of the ferrule.

Fiber alignment system 300 includes imaging device 340, which is positioned adjacent to the end of optical relay system 316 opposite laser source 304, to receive and image laser beams propagated by the optical relay system 316, and computer 346. The imaging device 340 may be coupled to an optical port 350 of surgical laser system 302, or disposed within surgical laser system 302, or disposed outside of surgical laser system 302 with an unobstructed line of sight to DOE 320 and along an axis of DOE 320. In certain embodiments, imaging device 340 is a charge-coupled device (CCD)-type device comprising an objective lens 342, e.g., a 250 mm (millimeter) effective focal length (EFL) objective lens, and a CCD image sensor 344, i.e., chip or integrated circuit. In certain embodiments, imaging device 340 is a complementary metal oxide semiconductor (CMOS)-type imaging device comprising a CMOS image sensor 344. Imaging device 340 is communicatively coupled to computer 346, e.g., wired or wirelessly, which may receive laser beam and optical fiber core patterns imaged by imaging device 340 and, for example, perform analysis thereof for alignment of optical fiber 360. In certain embodiments, imaging device 340 and/or computer 346 are further connected to display device 366 for displaying imaged laser beam and core patterns for observation by a user. An exemplary multi-spot laser beam pattern 348 is depicted on display device 366 in FIG. 3A.

With specific reference now to FIG. 3A and FIG. 4, at operation 402 of optical fiber alignment method 400, multi-spot laser beam pattern 348 is propagated by the surgical laser system 302 and a first image thereof is captured by imaging device 340. Multi-spot laser beam pattern 348 is generally formed by activating, i.e., switching on the laser source 304 to emit laser beam 310, which is then propagated by optical relay system 316, including beam splitters 313, and 318, fixed fold mirror 319, and DOE 320. DOE 320 is positioned along a light propagation path of optical relay system 316 such that laser beam 310 is aligned with the middle segment of DOE 320, which diffracts laser beam 310 into multi-spot laser beam pattern 348 consisting of a plurality of laser beams 311. For example, as depicted in FIG. 3A, DOE 320 diffracts laser beam 310 into multi-spot laser beam pattern 348 consisting of four beams 311a-d, thus forming four laser spots. Note that although four beams 311a-d are described herein, DOE 320 may diffract laser beam 310 into any suitable number of beams. For example, in certain embodiments, DOE 320 diffracts laser beam 310 into a number of beams corresponding to the number of fiber cores of an optical fiber to be aligned by fiber alignment system 300, such as two or more beams. In certain examples, DOE 320 diffracts laser beam 310 into a number of beams different than the number of fiber cores of an optical fiber to be aligned. For example, DOE 320 may diffract laser beam 310 into two beams when aligning a four-core optical fiber. Limiting the number of laser spots in a multi-spot laser beam pattern may be beneficial in terms of reducing background glare from scattered extraneous light, thus improving ease and accuracy of subsequent misalignment analysis operations.

Upon diffraction by DOE 320, laser beams 311a-d are propagated toward imaging device 340, which captures an image of the multi-spot laser beam pattern 348 and relays the image to computer 346. In certain embodiments, the image of multi-spot laser beam pattern 348 is stored by computer 346 for further analysis against a core pattern of the optical fiber. In certain embodiments, computer 346 calculates a clocking angle based on the image of multi-spot laser beam pattern 348 and stores the clocking angle in addition to or in lieu of the image. In further embodiments, the image of multi-spot laser beam pattern 348 is displayed, e.g., on display device 366, for inspection by the user. The multi-spot laser beam pattern 348 may be displayed in an upright or vertically- or horizontally-inverted orientation, depending on convenience for the user.

At operation 404 and as depicted in FIG. 3B, a second image of a multi-core pattern 362 (e.g., arrangement of cores) of optical fiber 360 is captured by imaging device 340. In order to visualize multi-core pattern 362 of optical fiber 360, the cores of the fiber 360 may be distally illuminated, thereby causing multiple illumination beams (e.g., four illumination beams corresponding to, for instance, the four cores of fiber 360) to be proximally propagated to imaging device 340. Accordingly, at operation 404, laser source 304 is inactivated, i.e., switched off, and an illumination beam 372 is propagated into a distal end of optical fiber 360 (e.g., which may also include a distal end of a cladding, e.g., an opaque or transparent cladding, that holds the cores within optical fiber 360) from illumination source 370. Here, utilization of an opaque cladding for optical fiber 260 may provide improved visualization of the cores thereof, as only the cores will be illuminated by illumination source 370. However, other types of cladding, such as a transparent cladding, are also contemplated.

Illumination source 370 may be any suitable type of illumination source, including but not limited to an LED light source, a laser light source, or an incoherent light source. The illumination beam 372 from illumination source 370 is transmitted through each core of multi-core optical fiber 360 and emitted from a proximal end of the fiber 360, which is coupled to optical port 330 of surgical laser system 302, though not fixed in rotational orientation. Note that at this stage in the operation, the proximal end of optical fiber 360 is connected to the optical port 330 via port adapter 314, but optical port 330 and condensing lens 324 are not yet fixed in orientation to allow for clocking, e.g., rotation, of optical port 330 and condensing lens 324 relative to laser surgical system 302.

Illumination beam 372 is emitted from the proximal end of optical fiber 360 in a multi-core pattern 362 consisting of four illumination beams 373a-d, each beam indicative of the rotational position of a corresponding core in optical fiber 360 through which the illumination beam 373a-d travelled. The illumination beams 373a-d are propagated from the proximal end of optical fiber 360 and through condensing lens 324, and then redirected by a temporary fold mirror 380 toward imaging device 340 for image capture. The captured image is then relayed to computer 346 for storage and/or analysis of rotational misalignment between multi-core pattern 362 and multi-spot laser beam pattern 348, and may also be displayed on display device 366 for user inspection. In certain embodiments, the image of multi-core pattern 362 is stored by computer 346 for analysis against multi-spot laser beam pattern 348. In certain embodiments, computer 346 calculates a clocking angle based on the image of core pattern 362 and stores the clocking angle for analysis in addition to or in lieu of the image.

As shown in FIG. 3B, fiber alignment system 300 may further include one or more optical devices that are temporarily positioned within surgical laser system 302 during operation 404 in order to relay illumination beams 373a-d to imaging device 340, since optical port 330 may not be in the direct line of sight of imaging device 340 (in FIG. 3B, optical port 330 for optical fiber 360 and optical port 350 for imaging device 340 are shown as being disposed perpendicular to each other). For example, as described above, in the embodiments of FIG. 3B, a temporary fold mirror 380 is positioned within surgical laser system 302 in order to deflect illumination beams 373a-d toward imaging device 340. Temporary fold mirror 380 may be mounted to surgical laser system 302, e.g., on a base plate thereof, or can be mechanically attached to imaging device 340. In certain examples, temporary fold mirror 380 may be mounted on a swinging or sliding arm and move, e.g., pivot, in and out of position for operation 404.

At operation 406, a misalignment between multi-spot laser beam pattern 348 and multi-core pattern 362 is determined. In certain embodiments, a captured image of multi-spot laser beam pattern 348, which may have been previously stored by computer 346, and captured image of multi-core pattern 362 are simultaneously displayed for a user, e.g., on display device 366, thus enabling the user to see both patterns simultaneously, with at least the multi-core pattern 362 being viewed in real-time. In such embodiments, the captured images of multi-spot laser beam pattern 348 and multi-core pattern 362 may be overlaid, further enabling the user to visually determine a rotational spot-to-core pattern misalignment. In certain embodiments, images of multi-spot laser beam pattern 348 and multi-core pattern 362 are displayed independent of each other, either simultaneously or in sequence, when determining misalignment between the laser beam spots and fiber cores.

In certain embodiments, the images of multi-spot laser beam pattern 348 and/or multi-core pattern 362 are further analyzed by computer 346 for the spot-to-core pattern misalignment determination. Computer 346 may use one or more algorithms to evaluate rotational misalignment between the two patterns 348, 362, and further determine and display actions necessary to align the patterns (i.e., corrections) for optimal coupling efficiency between laser beams and fiber cores. For example, computer 346 may determine and display for the user, e.g., on display device 366, an angular delta between the clocking angles of the multi-spot laser beam pattern 348 and the multi-core pattern 362, which corresponds to a degree of rotation of the optical fiber 360 that will align the two patterns 348, 362. As described below with reference to operation 408, a user may then adjust (e.g., rotate) one or more components of optical port 330 and condensing lens 324 to which the optical fiber 360 is connected, and the computer 346 may determine and display an updated angular delta based on the user's adjustment, in real-time. Upon alignment of the multi-spot laser beam pattern 348 and the multi-core pattern 362, the computer 346 may display an angular delta of 0°, thus indicating alignment of the patterns to the user. An exemplary method for determining rotational misalignment, e.g., using computer 346, is described in more detail below with reference to FIG. 8.

In further embodiments, computer 346 may analyze captured images of multi-spot laser beam pattern 348 and/or multi-core pattern 362 to determine additional characteristics of the laser beams 311a-d and/or optical fiber 360 for diagnostic purposes, such as shapes and/or sizes of laser spots and fiber cores, inter-spot and/or inter-core separations, relative intensity differences between laser beams 311, spurious scatter-light and diffracted light effects, and the like. Such information may be useful during diagnostics of issues relating to laser sources, as judged by their determined laser beam characteristics, as well as diagnostics of issues with, e.g., a DOE, as judged by laser beam intensities and shapes, in addition to better understanding laser beam-fiber coupling efficiency, etc.

At operation 408, after determining the necessary actions for alignment of multi-spot laser beam pattern 348 and multi-core pattern 362 at the interface plane of fiber 360, the optical fiber 360 is rotated, e.g., clocked, in accordance with the determined actions. In certain embodiments, rotation of optical fiber 360 may be achieved by the user manually rotating one or more components of optical port 330, which is coupled to condensing lens 324 (the combination of which may be referred to as the chimney of surgical laser system 302, to which optical fiber 360 is coupled), and port adapter 314. In certain embodiments, optical port 330 and port adapter 314 are rotated using, e.g., an actuator in communication with computer 346. Generally, multiple rounds of imaging and clocking (e.g., operations 402-408) may be repeatedly performed until the patterns 348, 362 are properly and accurately aligned.

At operation 410, upon alignment, optical port 330 and port adapter 314 may be fixed in place by, e.g., soldering or application of an adhesive thereto, immobilization via tightening of a screw against a side of optical port 330, or other locking mechanism, thereby resulting in surgical laser system 302 having aligned laser beam and core patterns.

Figure 5A:
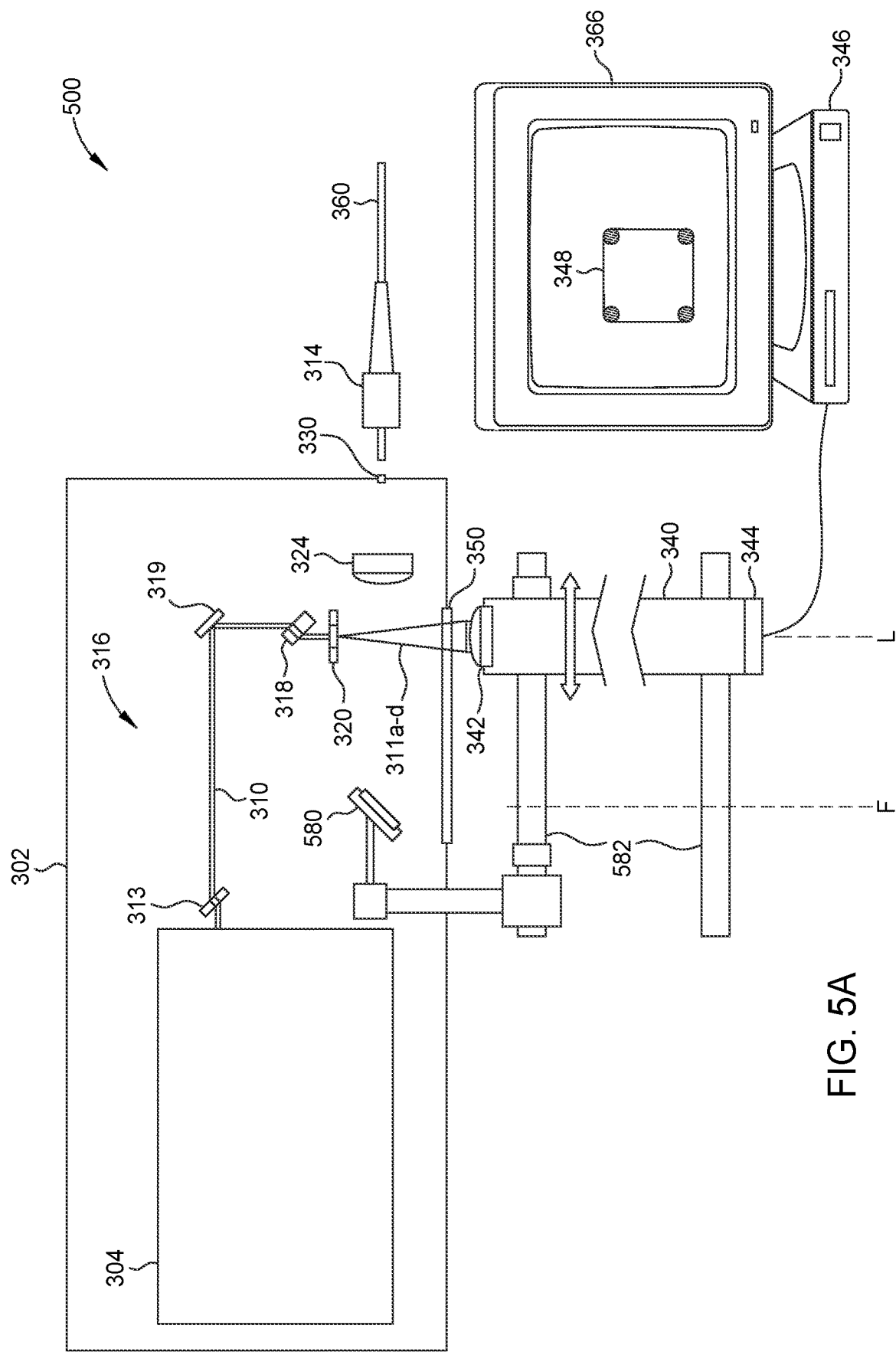
FIGS. 5A-5C illustrate another fiber alignment system for use with the fiber alignment method of FIG. 4, in accordance with certain embodiments of the present disclosure.
Figure 5B:
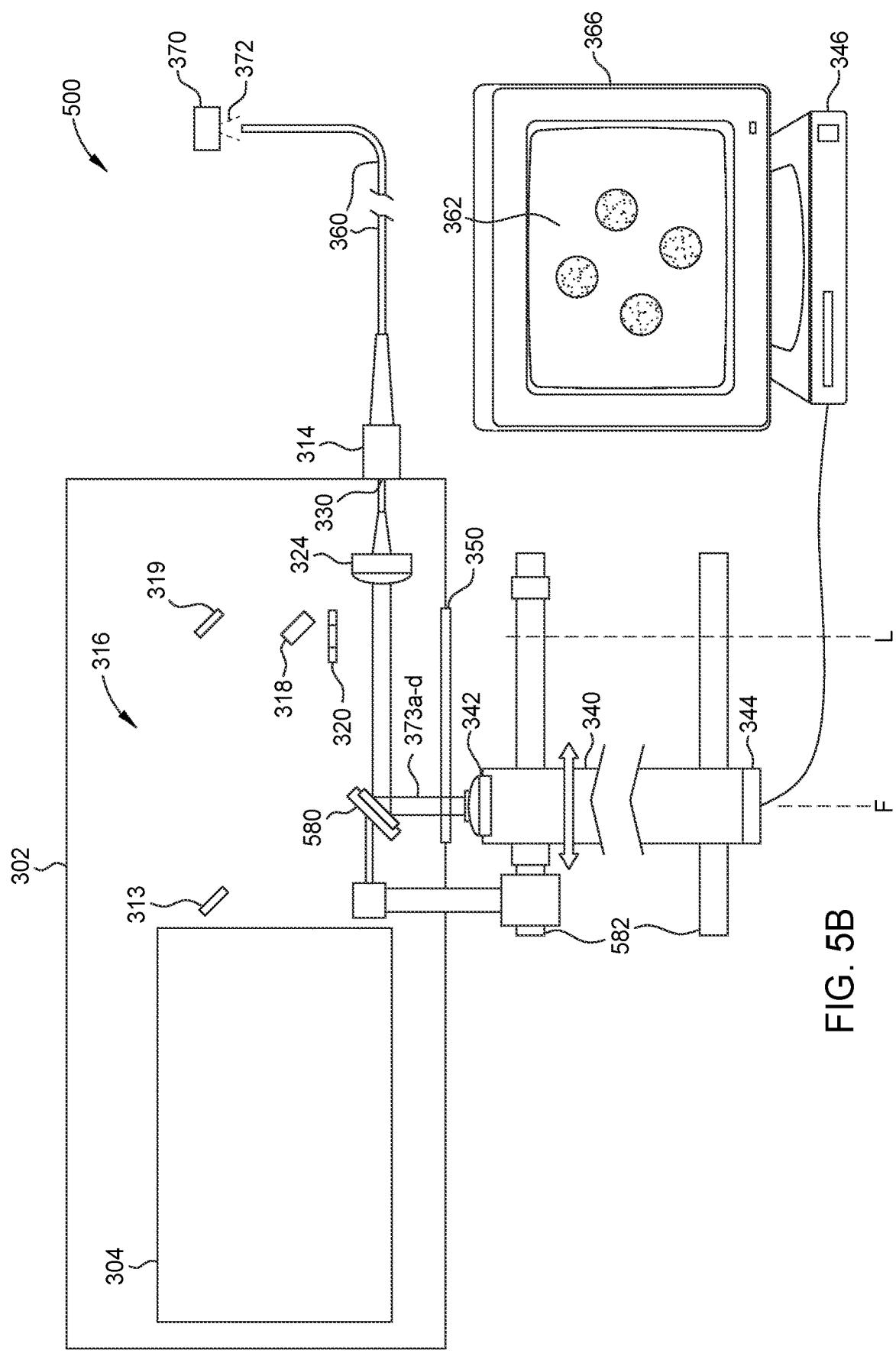
Figure 5C:
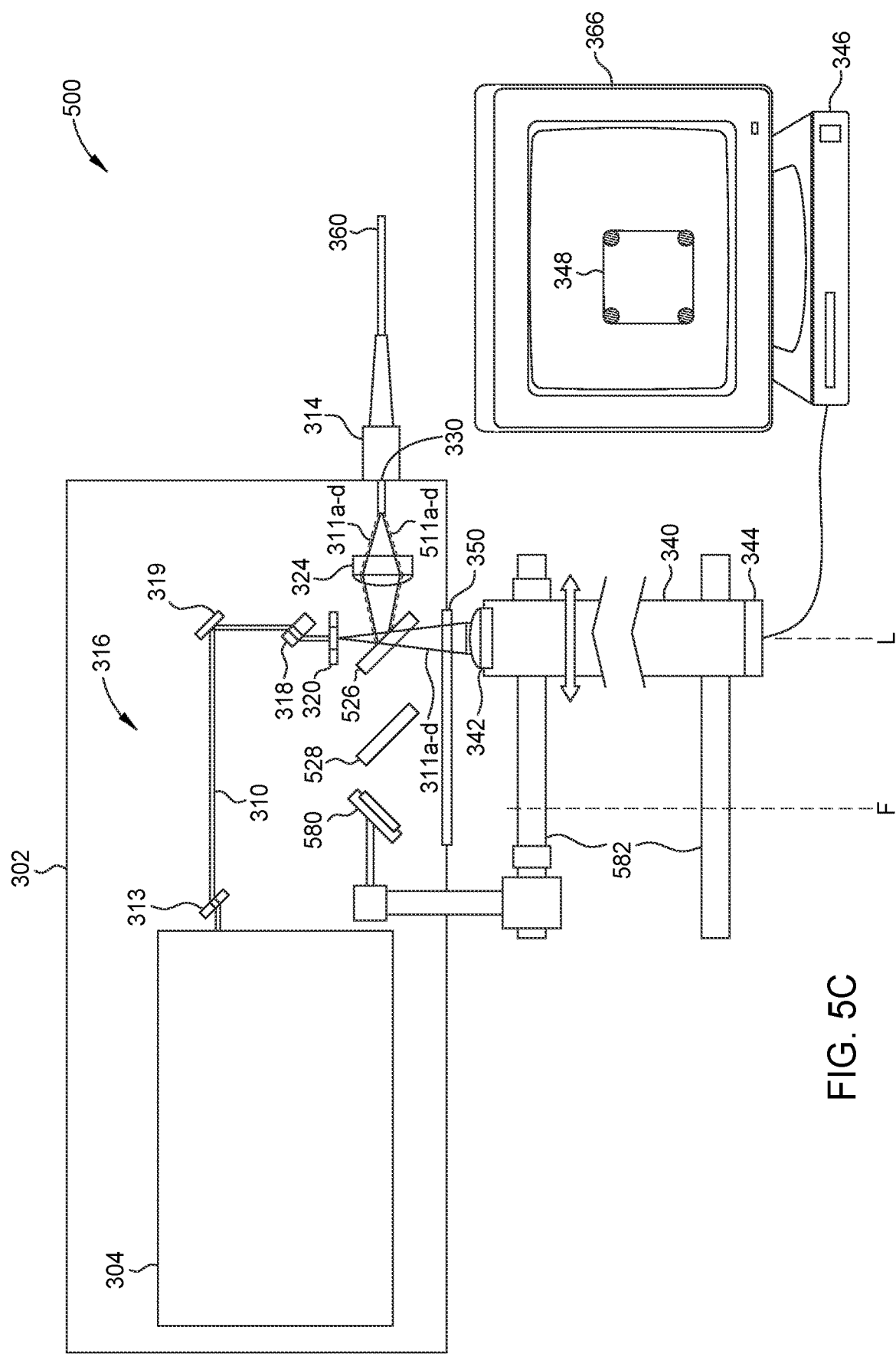

FIGS. 5A-5C illustrate a second fiber alignment system 500 for the surgical laser system 302 that may be utilized with optical fiber alignment method 400, in accordance with certain embodiments of the present disclosure. Fiber alignment system 500 is substantially similar to fiber alignment system 300 above, and may be considered a modified version thereof.

As shown, in addition to the features of alignment system 300, the fiber alignment system 500 further includes imaging device translation assembly 582 attached to imaging device 340. Imaging device translation assembly 582 is utilized to translate (i.e., move) imaging device 340 from a first position L (shown in FIG. 5A) to a second position F (shown in FIG. 5B), thereby enabling imaging device 340 to capture images of laser beams 311a-d and illumination beams 373a-d at different positions. Accordingly, during the method 400, imaging device 240 is first placed in position L at operation 402 in order to receive laser beams 311a-d propagated from DOE 320. Then, upon imaging the laser beams, the imaging device 340 is translated to second position F for imaging of illumination beams 373a-d at operation 404. Imaging device translation assembly 582 may generally include any suitable type of mechanism for laterally translating imaging device 340, manually or automatically. For example, in certain embodiments, imaging device translation assembly 582 includes one or more optical rails upon which imaging device 340 is movably connected and translated across via manual input from the user or via a motorized actuator.

Similar to the alignment system 300, fiber alignment system 500 may utilize one or more additional optical devices to relay the illumination beams 373a-d toward imaging device 340. However, unlike alignment system 300, fiber alignment system 500 may utilize a fixed (e.g., permanent) optical device, such as fixed floating mirror 580, instead of a temporary device that may require positioning or re-positioning in between operations 402 and 404 and/or after alignment of multi-spot laser beam pattern 348 and multi-core pattern 362. Accordingly, utilizing fiber alignment system 500 may provide added efficiency as compared to other systems. Even further, avoiding repeated insertion, alignment, and removal of mirror 580 may also provide improved uniformity of results as repetition of such operations may result in slight clocking angle errors. In certain embodiments, fixed floating mirror 580 may be attached directly to imaging device translation assembly 582 for easy installation and removal of fiber alignment system 500 from surgical laser system 302, or can be attached to a base plate of surgical laser system 302.

When utilizing fiber alignment system 500, the method 400 may be performed before or after placement of one or more other permanent optical devices necessary for operation of the surgical laser system 302. For example, in certain embodiments, one or more dichroic mirrors may be placed (e.g., affixed or installed) in surgical laser system 302 before or after alignment of optical fiber 360. The dichroic mirrors may be utilized to deflect the one or more laser beams (e.g., aiming beams and/or treatment beams) produced by laser source 304 or other source toward optical port 330 while a user operates the surgical laser system 302 during an ophthalmic procedure. FIG. 5A and FIG. 5B show fiber surgical laser system 302 before placement of dichroic mirror 526, which may be a green dichroic mirror for deflecting green treatment beams toward optical port 330, and dichroic mirror 528, which may be a red dichroic mirror for deflecting red aiming beams toward optical port 330. Conversely, FIG. 5C shows fiber surgical laser system 302 after placement of both dichroic mirrors 526, 528. For example, FIG. 5C illustrates an embodiment where the dichroic mirrors 526, 528 are installed prior to the performance of method 400. The existence of dichroic mirrors 526, 528 does not impact the alignment of the optical fiber 360, since at least a portion of laser and/or illumination light passes through the dichroic mirrors 526, 528. In such embodiments, one or both of the dichroic mirrors 526, 528 may be adjusted and fixed in place to translationally align the multi-spot laser pattern and multi-core pattern using similar methods to those described below with reference to FIGS. 6A-6D below.

Figure 6A:
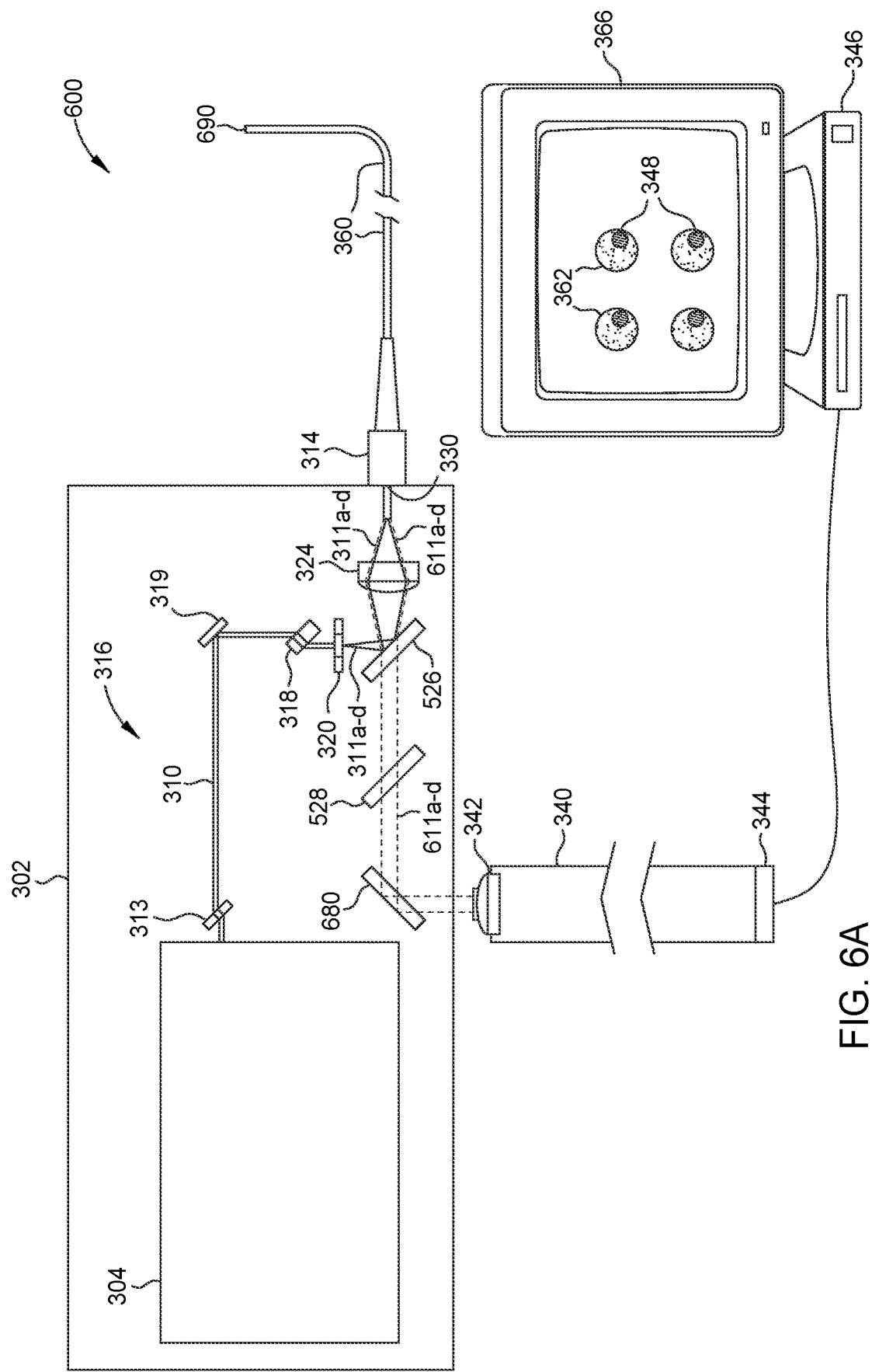
FIGS. 6A-6D illustrate a fiber alignment system for a surgical laser system, in accordance with certain embodiments of the present disclosure.

FIGS. 6A-6D illustrate a third fiber alignment system 600 for a surgical laser system 302, in accordance with certain embodiments of the present disclosure. FIG. 7 illustrates a flow diagram of an optical fiber alignment method 700 utilizing the fiber alignment system 600, in accordance with certain embodiments of the present disclosure. Accordingly, FIGS. 6A-6D and FIG. 7 are herein described together for clarity.

Fiber alignment system 600 is substantially similar to fiber alignment systems 300 and 500 above. However, fiber alignment system 600 may allow for performing misalignment analysis without installing and removing a temporary mirror or having to move the image sensor. The fiber alignment system 600 also allows for simultaneously propagating and imaging a laser beam pattern and a fiber core pattern, as further described in relation to method 700.

As shown in FIGS. 6A-6D and previously described above with reference to FIG. 5C, dichroic mirror 526 may be positioned in surgical laser system 302 to deflect incoming laser beams, e.g., treatment and/or aiming beams, from DOE 320 toward condensing lens 324 and, thereby, toward the interface plane of the proximal end of an attached optical fiber, e.g., optical fiber 360. Laser beams directed towards the proximal end of the optical fiber are then reflected back by the proximal interface plane and/or distal interface plane of the optical fiber towards dichroic mirror 526, forming a pattern corresponding with both the laser beam pattern shaped by surgical system 302 and the pattern of the core arrangement of the optical fiber (e.g., identifying areas of each core therein). For example, a first portion of the laser beams is reflected back by the proximal interface plane of the optical fiber and maintains the laser spot pattern formed by DOE 320. A second portion of the laser beams, however, travels distally through the one or more fiber cores of the optical fiber to the distal ends thereof, and then subsequently travels back proximally through the fiber core(s) before transmitting proximally out of the proximal end of the fiber in a core-defined pattern. Thus, the laser beams reflected from the optical fiber to the dichroic mirror 526 may correspond to both a laser spot pattern and a core-defined pattern.

The reflected laser beams (e.g., the combination of the first and second portions of the laser beams) exit the proximal fiber plane of the optical fiber, pass through dichroic mirrors 526 and/or 528, and reach fold mirror 680, which then deflects the reflected laser light beams towards the imaging device 340. Accordingly, as shown in FIG. 6A, simultaneous imaging of the laser beam pattern formed by surgical laser system 302, as well as the core pattern formed by the optical fiber, can be achieved without the need for back-illumination of the optical fiber or the addition of temporary optical relay devices and/or translation components, e.g., optical rails.

In certain embodiments, to improve visualization of both laser spot and core-defined patterns, it is advantageous to suppress back-reflection of distally-travelling laser beams in each fiber core at the distal fiber plane/air interface (i.e., distal interface plane). The reflection of distally-travelling laser beams at the distal interface plane causes the laser beams to travel back through each fiber core in the proximal direction and fill the area of each fiber core. If this reflection is not greatly reduced, luminous exitance of the laser beams reflected by the distal interface plane at the proximal ends of the fiber cores will be roughly the same as the luminous exitance of laser beams reflected by the proximal endfaces of the fiber cores. As a result, the image of the laser beam pattern may be washed out by the core-defined pattern and invisible to the human observer or to a software that is trying to sense the location of the laser spots. To prevent this effect, in certain embodiments, the distal end of the optical fiber may be immersed in an index matching fluid or coated with an anti-reflection (AR) coating, depicted in FIGS. 6A-6D as 690.

The index matching fluid or AR coating 690 may reduce the amount of laser beams reflected in the proximal direction through each core of the optical fiber by the distal interface plane, thus preventing a "wash out" of the laser spot pattern which causes difficulties visualizing the laser spot pattern during alignment operations. Examples of suitable index matching fluids may include, but are not limited to, water which has a refractive index of about 1.33, and olive oil which has a refractive index of about 1.46. In embodiments where an AR coating is utilized, the AR coating may be directly applied to the distal interface plane of the optical fiber, or the distal end of the optical fiber may be bonded to an optical element with an AR-coated or AR moth's eye distal surface. Examples of suitable AR coatings include magnesium fluoride-based coatings. In further embodiments, the distal end of the optical fiber may be bonded to a neutral density optical element, which creates a strong attenuation of the light passing through in both directions (the distal end of the neutral density optical element may be AR-coated or coated with an absorptive black coating).

Dichroic mirror 526 may generally include any suitable type of dichroic device configured to direct laser beam(s) in two or more propagation directions. Typically, the type of device and properties of dichroic mirror 526 are dependent upon the characteristics of laser beam 310 emitted by laser source 304. For example, in embodiments where laser beam 310 is a green laser beam, dichroic mirror 526 may be a green dichroic mirror having a high-reflectance and narrow spectral notch for reflecting a green laser beam. In embodiments where laser beam 310 is a red laser beam, dichroic mirror 526 may be a red dichroic mirror having a high-reflectance and narrow spectral notch for reflecting a red laser beam. Having spectrally narrow dichroic mirrors facilitates maximum transmittance of white illumination light therethrough.

Turning now to FIG. 6A and the method 700 of FIG. 7, alignment of the multi-core optical fiber 360 using alignment system 600 begins at operation 702, where multi-spot laser beam pattern 348 is simultaneously imaged along with multi-core pattern 362. During operation 702, laser source 304 is activated to emit laser beam 310, which is then directed by optical relay system 316, including DOE 320 and dichroic mirror 526, towards optical port 330. As shown in FIG. 6A, DOE 320 diffracts laser beam 310 into multi-spot laser beam pattern 348 consisting of four beams 311a-d, which are deflected by dichroic mirror 526 towards the interface plane of the proximal end of the optical fiber 360 at optical port 330.

A first portion of the laser beams 311a-d is then reflected from the proximal interface plane of optical fiber 360, while a second portion transmits through each core and reflects back from the distal interface plane of optical fiber 360. The reflected beams, labeled as 611a-d in FIG. 6A, pass through dichroic mirror 526, and dichroic mirror 528, before being deflected to imaging device 340 by fold mirror 680 for imaging. A captured image of both multi-spot laser beam pattern 348 and multi-core pattern 362 is then relayed to computer 346 for storage and/or analysis of rotational misalignment therebetween, as well as for display on display device 366. As described above, the portion of laser beams 611a-d reflected by the proximal interface plane of optical fiber 360 corresponds to multi-spot laser beam pattern 348 formed by DOE 320, while the portion of laser beams 611a-d reflected by the distal interface plane of optical fiber 360 corresponds to multi-core pattern 362, thereby facilitating simultaneous imaging of both patterns without the need for inactivation of laser source 304 and/or the addition of temporary optical relay devices and/or translation components, e.g., optical rails. Furthermore, no additional back-illumination of optical fiber 360 is required, e.g., by illumination source 370, since light from laser beam 310 may form both laser beam and core patterns upon reflectance from the proximal interface plane of optical fiber 360. As shown on display device 366, both the multi-spot laser beam pattern 348 and multi-core pattern 362 are captured by imaging device 340, which appear juxtaposed or overlaid on one another when imaged. In certain embodiments, the image of multi-spot laser beam pattern 348 and multi-core pattern 362 is stored by computer 346 for rotational misalignment analysis. In certain embodiments, computer 346 calculates a clocking angle based on the image of multi-spot laser beam pattern 348 and multi-core pattern 362 and stores the clocking angle for analysis in addition to or in lieu of the image.

Figure 6B:
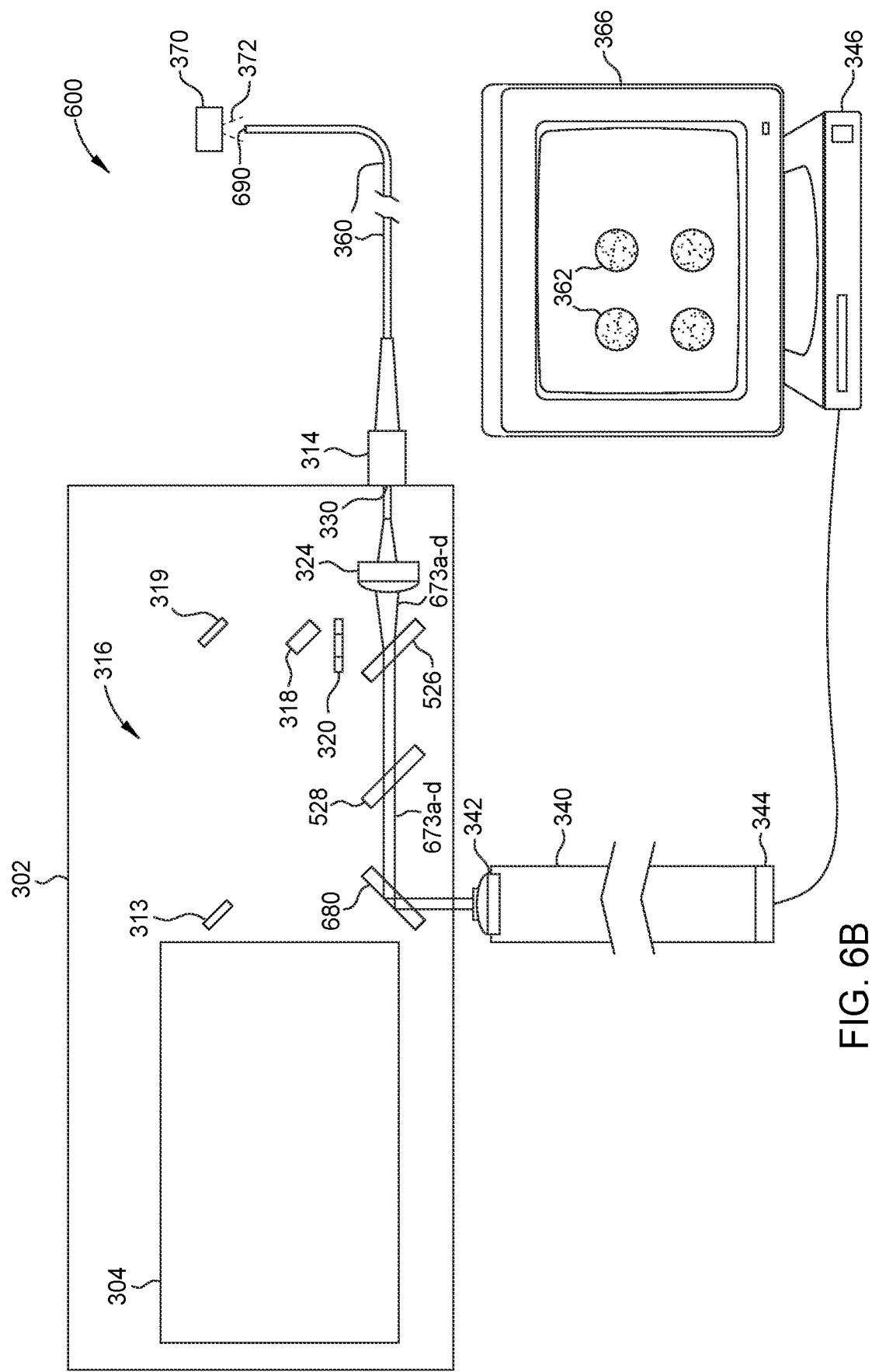
Figure 7:
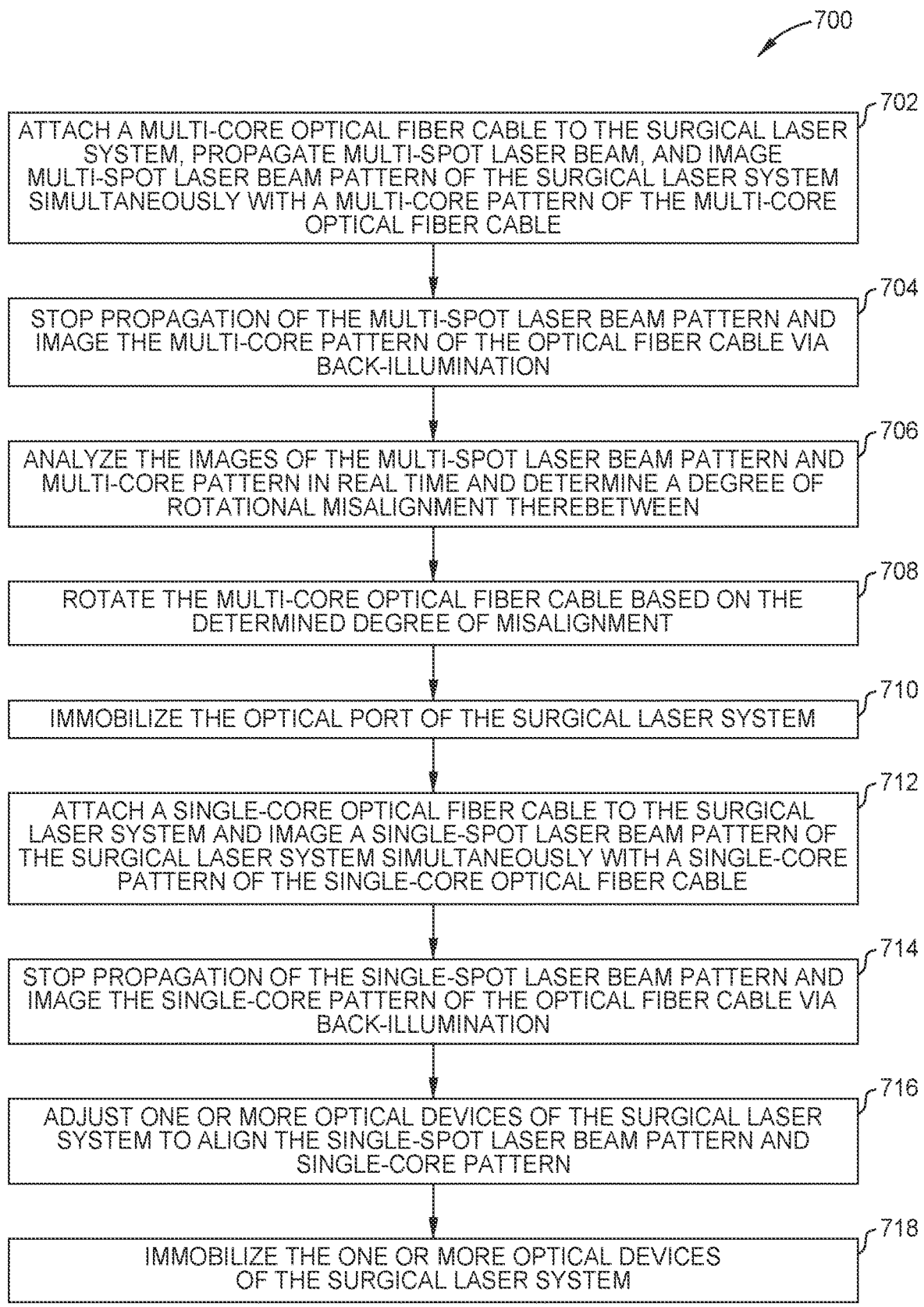
FIG. 7 illustrates a fiber alignment method using the fiber alignment system of FIGS. 6A-6D, in accordance with certain embodiments of the present disclosure.

At operation 704, a second image of multi-core pattern 362 may be optionally captured and registered (e.g., compared) with the overlaid patterns 348, 362, as shown in FIG. 6B. The second image of multi-core pattern 362 may aid a user or computer 346 in better determining edges of each core for subsequent misalignment analysis. In certain embodiments, the second image of multi-core pattern 362 is created by inactivating the laser source 304 and illuminating the distal end of optical fiber 360, similar to operation 404 of method 400, thus causing fiber 360 to emit illumination beams 673a-d at the proximal end thereof corresponding with the core arrangement of optical fiber 360. The illumination beams 673a-d may then be passed through dichroic mirrors 526 and 528 and deflected towards imaging device 340 by fold mirror 680 for image capture. The captured second image may be relayed to computer 346 for storage and/or analysis, as well as to display on display device 366 for user inspection. In certain embodiments, the image of multi-core pattern 362 is stored by computer 346 for rotational misalignment analysis against the multi-spot laser beam pattern 348. In certain embodiments, computer 346 calculates a clocking angle based on the image of multi-core pattern 362 and stores the clocking angle for analysis in addition to or in lieu of the image. In certain embodiments, the second image of multi-core pattern 362 is captured prior to performing operation 702.

At operation 706, rotational (e.g., clocking) misalignment between multi-spot laser beam pattern 348 and multi-core pattern 362 is determined. In certain embodiments, the determination is manually achieved via user observation of displayed image(s) of multi-spot laser beam pattern 348 and multi-core pattern 362. In examples where multi-spot laser beam pattern 348 and multi-core pattern 362 have been captured simultaneously, both patterns may be viewed by the user in real-time, and the user may rotate one or more components of optical port 330 and condensing lens 324 until the overlaid patterns are aligned. In embodiments where the second image of multi-core pattern 362 is utilized, images of multi-spot laser beam pattern 348 and multi-core pattern 362 may be displayed independently of each other, either simultaneously or in sequence, wherein at least the multi-core pattern 362 may be viewed by the user in real-time for misalignment determination.

In certain embodiments, the misalignment determination is further achieved via analysis of captured image(s) of multi-spot laser beam pattern 348 and multi-core pattern 362 by computer 346. Computer 346 may use one or more algorithms to evaluate the rotational misalignment between the two patterns 348, 362, in real-time, and further determine actions necessary to align the patterns (i.e., corrections). In certain embodiments, computer 346 may determine and display for a user an angular delta or degree of rotation for the optical fiber 360 to align the two patterns 348, 362 for optimal laser beam and fiber core coupling efficiency. Upon user adjustment, e.g., at operation 708, the computer 346 may re-evaluate the rotational misalignment and display an updated degree of rotation for the user, in real-time, until the patterns are aligned. An exemplary method for determining rotational misalignment is described in further detail below with reference to FIG. 8.

In certain embodiments, in order to optimize visualization of multi-core pattern 362 for computer analysis, contrast of luminous exitance between each core and the inter-core region in multi-core pattern 362 may be increased. In certain embodiments, contrast between luminous exitance of the cores and the inter-core region is increased by adjusting (e.g., increasing) the power of laser source 304, reducing the amount of ambient light, and/or shrouding lens 342 or imaging device 340.

In further embodiments, computer 346 further analyzes the captured images of multi-spot laser beam pattern 348 and/or multi-core pattern 362 to determine additional characteristics of the laser beams 311 and/or optical fiber 360 for diagnostic purposes, such as shapes and/or sizes of laser spots and fiber cores, inter-spot and/or inter-core separations, relative intensity differences between laser beams 311, spurious scatter-light and diffracted light effects, and the like.

At operation 708, upon determining a degree of rotational misalignment between the patterns, the optical fiber 360 may be clocked to rotationally align multi-spot laser beam pattern 348 and the multi-core pattern 362 at the interface plane of fiber 360. In certain embodiments, clocking of optical fiber 360 may be achieved by the user rotating optical port 330, e.g., the chimney of surgical laser system 302, and port adapter 314. Alignment of the two patterns 348, 362 may be achieved while one or both of the patterns are imaged and visualized in real-time, thus enabling quick and efficient adjustment and, if necessary, re-adjustment by the user with real-time visual confirmation. In certain embodiments, clocking of optical fiber 360 is achieved via an actuator in communication with computer 346.

At operation 710, after rotational alignment of multi-spot laser beam pattern 348 and the multi-core pattern 362, optical fiber 360 may be fixed in place by, e.g., soldering or application of an adhesive to optical port 330 and port adapter 314, immobilization via tightening of a screw against a side of optical port 330, or other locking mechanism, thereby resulting in surgical laser system 302 having rotationally aligned (e.g., clocked) multi-spot laser beam and multi-core patterns.

Figure 6C:
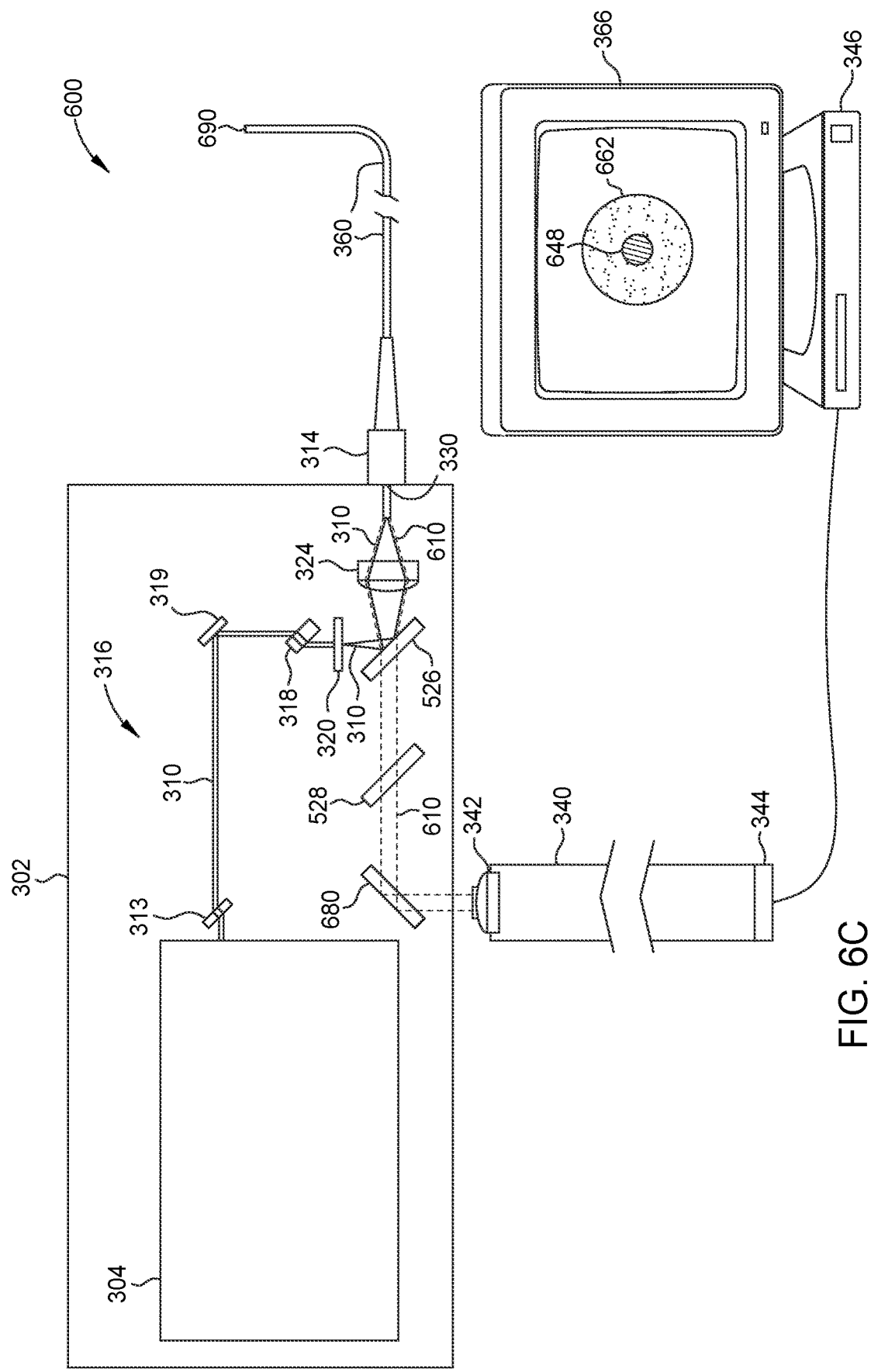

Turning now to FIG. 6C, at operation 712, multi-core optical fiber 360 is replaced with a single-core optical fiber 660 and a single-core pattern 662 is simultaneously imaged with single-spot laser beam pattern 648. The single spot pattern can be created simply by translating the multi-segment diffraction optical element 320 away from the laser beam 310, or by translating the multi-segment diffraction optical element 320 to cause the beam to pass through a segment that has no diffractive element, only planar surfaces. Imaging of single-core pattern 662 and single-spot laser beam pattern 648 is utilized to determine translational misalignment between optical relay system 316 and optical port 330, which is then corrected for final assembly of surgical laser system 302. Generally, optical fiber 660 includes any suitable type of single-core optical fiber having a single core with a suitable diameter, e.g., 25 μm.

During operation 712, laser source 304 is re-activated to emit laser beam 310, which is propagated by optical relay system 316, including DOE 320 and dichroic mirror 526, to optical port 330 and imaging device 340. At least for operation 712, DOE 320 is switched into or placed in a single-spot mode in order to maintain laser beam 310 as a singular and undiffracted beam, thus forming single-spot laser beam pattern 648 for imaging purposes. As shown in FIG. 6C, laser beam 310 is propagated from DOE 320 to dichroic mirror 526, which deflects light beam 310 to a proximal interface plane of optical fiber 660 at optical port 330. A first portion of laser beam 310 is then reflected from the proximal interface plane of optical fiber 660, while a second portion travels distally through the single core of optical fiber 660 and reflects from the distal interface plane thereof. Both portions of the reflected laser beam, labeled 610 in FIG. 6C, are thereafter passed through dichroic mirrors 526 and 528 before being deflected to imaging device 340 by fold mirror 680 for visualization and analysis. As described above, the laser beam 610 reflected from optical fiber 660 corresponds to both single-spot laser beam pattern 648 and single-core pattern 662, thus facilitating simultaneous imaging of both patterns without the need for back-illumination of the optical fiber or the addition of temporary optical relay devices and/or translation components, e.g., optical rails. In certain embodiments, the image of single-spot laser beam pattern 648 and single-core pattern 662 is stored by computer 346 for translational misalignment analysis. In certain embodiments, computer 346 calculates a translational delta based on the image of single-spot laser beam pattern 648 and single-core pattern 662 and stores the translational delta for analysis in addition to or in lieu of the image.

Figure 6D:
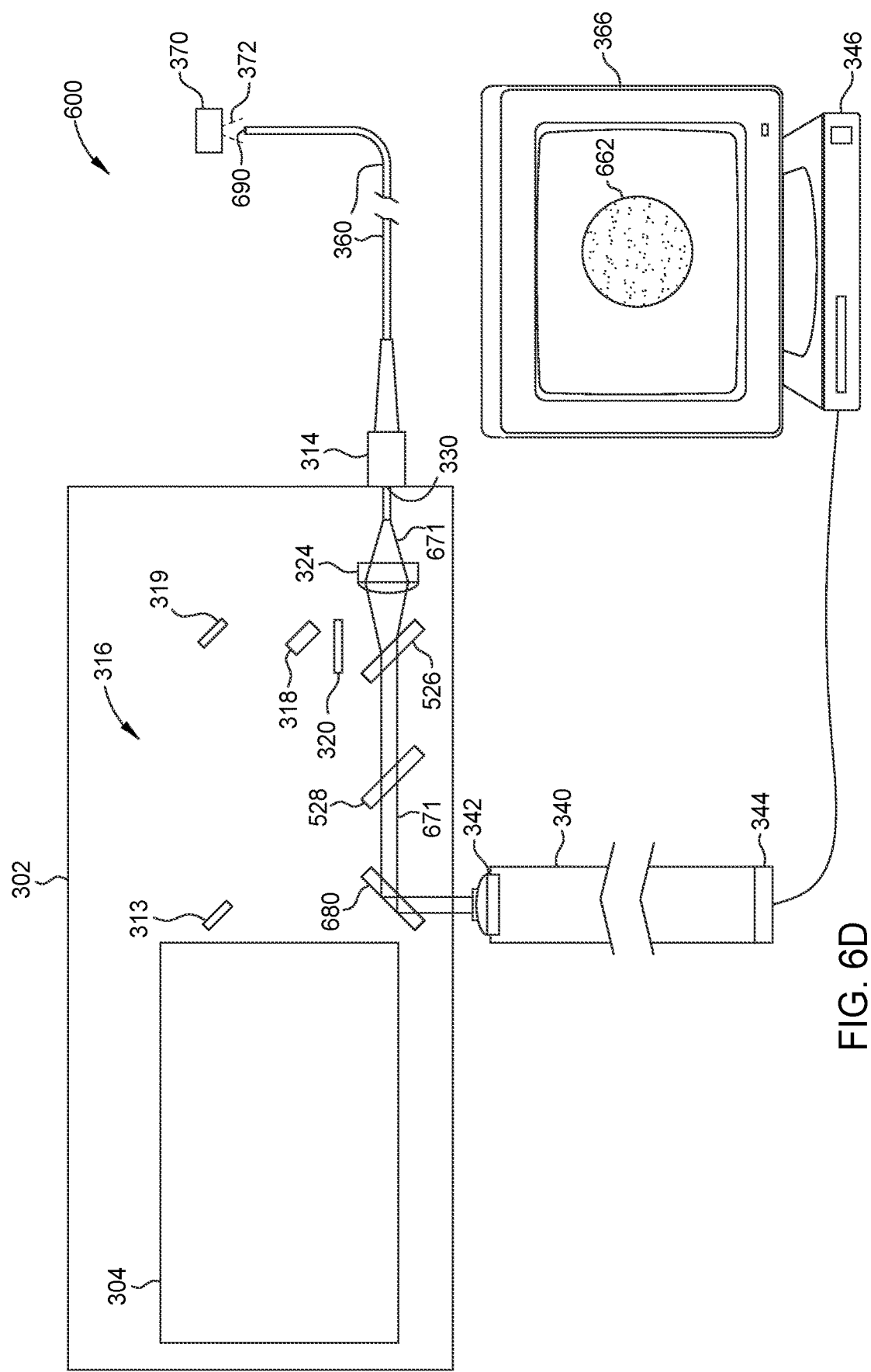

At operation 714, a second image of single-core pattern 662 may be optionally captured and registered (e.g., compared) with the initial image of overlaid patterns 648, 662, as shown in FIG. 6D. The second image of single-core pattern 662 may aid a user or computer 346 in better determining edges of the fiber core for subsequent translational misalignment analysis. In certain embodiments, the second image of single-core pattern 662 is created by inactivating the laser source 304 and illuminating the distal end of optical fiber 660 similar to operation 704, thereby causing fiber 660 to emit an illumination beam 671 at the proximal end thereof corresponding with the single core arrangement of optical fiber 660. The illumination beam 671 is passed through dichroic mirrors 526 and 528 and deflected towards imaging device 340 by fold mirror 680 for image capture. The capture image may then be relayed to computer 346 for storage and/or analysis, as well as to display on display device 366 for user inspection. In certain embodiments, the image of single-core pattern 662 is stored by computer 346 for translational misalignment analysis. In certain embodiments, computer 346 calculates translational delta based on the image of single-core pattern 662 and stores the translational delta for analysis in addition to or in lieu of the image. In certain embodiments, the second image of single-core pattern 662 is captured prior to performing operation 712.

At operation 716, a translational (e.g., lateral) misalignment between single-spot laser beam pattern 648 and single-core pattern 662 is determined. In certain embodiments, the determination is manually achieved via user observation of displayed images of single-core pattern 662 and single-spot laser beam pattern 648. In examples where single-spot laser beam pattern 648 and single-core pattern 662 have been captured simultaneously, both patterns may be viewed by the user in real-time, and the user may adjust one or more optical devices of the optical relay system 316, e.g., dichroic mirror 526, until the overlaid patterns are laterally aligned. In embodiments where the second image of single-core pattern 662 is utilized, images of single-spot laser beam 648 and single-core pattern 662 may be displayed independently of each other, either simultaneously or in sequence, wherein at least the single-core pattern 662 may be viewed by the user in real-time for misalignment determination.

In certain embodiments, the determination is further achieved via analysis of the captured images of single-spot laser beam 648 and single-core pattern 662 by computer 346. Computer 346 may use one or more algorithms to evaluate translational misalignment between the two patterns 648, 662, and may further determine actions necessary to align the patterns (i.e., corrections) for optimal coupling efficiency between the laser beam and fiber core. For example, in certain embodiments, computer 346 may determine and display for the user, e.g., on display device 366, a distance of translation for single-spot laser beam pattern 648 to align the two patterns 648, 662. Upon user adjustment of the optical relay system 316, e.g., at operation 716, the computer 346 may re-evaluate the translational misalignment and display an updated translational misalignment for the user, in real-time, until the patterns are aligned. Translational misalignment between the two patterns 648, 662 may, in certain examples, be determined by computer 346 by identifying the center of each pattern and determining a distance therebetween.

At operation 716, one or more devices of optical relay system 316 are adjusted to laterally align single-spot laser beam pattern 648 with single-core pattern 662. For example, in certain embodiments, dichroic mirror 526 is compound-tilted to laterally center single-spot laser beam pattern 648 onto a center of single-core pattern 662. In certain embodiments, compound tilting of, e.g., dichroic mirror 526, is achieved manually by user rotation. In certain embodiments, compound tilting is facilitated by an actuator in communication with computer 346. Alignment of the two patterns 648, 662 may be done while imaging the patterns in real-time, thus enabling quick and efficient adjustment and, if necessary, re-adjustment with real-time visual confirmation.

At operation 718, once, e.g., dichroic mirror 526 is positioned and oriented such that patterns 648 and 662 are centrally aligned, dichroic mirror 526 may be fixed in place via, e.g., soldering or use of an adhesive applied thereto, to prevent further movement of dichroic mirror 526. Operations 712-718 may then be repeated, as necessary, if translational misalignment once again occurs during fixation of dichroic mirror 526. For example, if shifting of dichroic mirror 526 occurs during solidification of the solder or adhesive, or if releasing a clamp or other device holding dichroic mirror 526 causes shifting after operation 716, then one or more of operations 712-716 may be repeated until patterns 648, 662 are translationally aligned.

After the translational alignment is performed, single-core optical fiber 660 may then be removed from surgical laser system 302 to complete alignment and assembly of surgical laser system 302 before use thereof. Completion of method 700 thus results in surgical laser system 302 having rotationally and translationally aligned multi-spot laser beam and multi-core patterns.

Example Misalignment Analysis and Alignment

Generally, the relative laser spot positions within, e.g., a four-spot laser beam pattern may be more tightly toleranced than the relative core positions within a corresponding four-core fiber pattern. Thus, misalignment analysis between every core and laser spot may be unnecessarily complex, especially when the centers of the cores form an irregular polygon. In order to streamline the process, only two cores of optical fiber 360 and two laser spots of multi-spot laser beam pattern 348 may be used for determining misalignment by computer 246, as described below.

Figure 8:
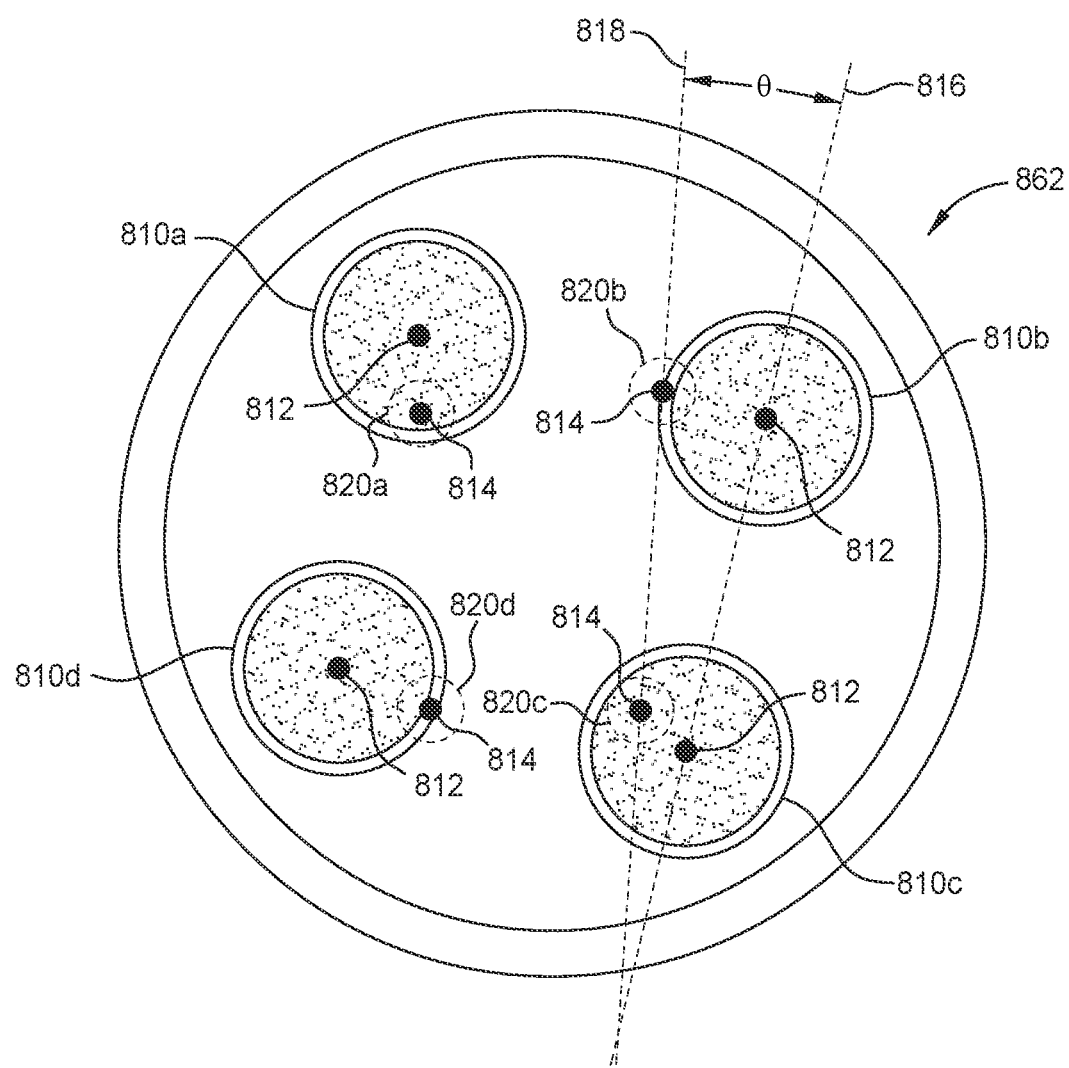
FIG. 8 schematically illustrates a fiber during a method of determining fiber misalignment, in accordance with certain embodiments of the present disclosure.

FIG. 8 schematically illustrates a multi-core pattern 862 as it would be imaged during the optical fiber alignment methods 400, 700 described above, in accordance with certain embodiments of the present disclosure. Multi-core pattern 862 includes four core regions 810a-d that are arranged in a "2×2" matrix and represent the four cores of a multi-core optical fiber. Four laser spots 820a-d of a multi-spot laser beam pattern are shown overlaid, in phantom, over the multi-core pattern 862, as would be seen by a user at, e.g., operations 406 and 708. As shown, laser spots 820a-d are misaligned with core regions 810a-d.

To determine the degree of misalignment and an appropriate clocking angle for correcting the multi-core pattern 862, computer 346 identifies centers 812 of the core regions 810a-d and centers 814 of laser spots 820a-d. A first axis 816 is formed through two of the core centers 812, and a second line 818 is formed through two of the spot centers 814. Generally, any pair of core regions 810a-d may be utilized for forming axis 816, and any pair of laser spots 820a-d may be utilized for forming axis 818. However, when axis 816 is formed through diagonal core regions 810 (e.g., 810a and 810d, or 810b and 810c), axis 818 is typically formed through diagonal laser spots 820. Similarly, when axis 816 formed through adjacent core regions 810, axis 818 is correspondingly formed through adjacent laser spots 820. In certain embodiments, utilizing diagonal core regions and diagonal laser spots may be advantageous, because using a diagonal pair of cores may result in a smaller angular clocking error since the distance between diagonal cores, which is used in algorithms for calculating a clocking angle error (angle $\Theta$ below), is sqrt(2)=1.41× greater than a distance between adjacent cores.

Upon formation of axes 816, 818, an angle $\Theta$ between the axes is determined by computer 346. Angle $\Theta$ corresponds to the degree of rotational misalignment between multi-core pattern 862 and the overlaid laser beam pattern, as well as the clocking angle required to align the two patterns. Thus, after determination of angle $\Theta$, the multi-core optical fiber corresponding to multi-core pattern 862 may be rotated an angle of rotation equivalent to angle $\Theta$ to make parallel axes 816 and 818 and align the laser spots 820a-d with the cores thereof. Thereafter, the optical port, e.g., optical port 330, is fixed in place as described above with reference to methods 400 and 700. Note that a similar method of determining misalignment may be utilized for clocking an optical fiber, e.g., fiber 360, with a port adapter, e.g., port adapter 114, prior to attaching the port adapter to a surgical laser system for alignment of the optical fiber with a laser beam pattern. In such examples, the axis 816 formed through centers of core regions 810 is compared to an axis bisecting the port adapter 314 from a 12:00 position to a 6:00 position of the port adapter 314, and the angle determined therebetween is utilized to align the optical fiber 360 with the port adapter 314.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The foregoing description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." The word "exemplary" is used herein to mean "serving as an example, instance, or illustration." Any aspect described herein as "exemplary" is not necessarily to be construed as preferred or advantageous over other aspects.

Example Embodiments

Embodiment 1: A optical fiber alignment system, including a surgical laser system having a laser source configured to propagate a laser beam, an imaging device, a memory comprising executable instructions, a processor in data communication with the memory and configured to execute the instructions, which cause the processor to control the laser source and the imaging device. The surgical laser system further includes an optical device configured to redirect the laser beam onto a first interface plane at a proximal end of an optical fiber coupled to the surgical laser system through a port, wherein redirecting the laser beam onto the first interface plane at the proximal end of the optical fiber causes a first portion of the laser beam to reflect at the first interface plane and a second portion of the laser beam to simultaneously reflect at a second interface plane at a distal end of the optical fiber, wherein simultaneous reflection of the first and second portions of the laser beam enables simultaneous imaging of a beam pattern of the laser beam and a core pattern of the optical fiber by the imaging device.

Embodiment 2: The optical fiber alignment system of embodiment 1, wherein the optical device is a dichroic mirror.

Embodiment 3: The optical fiber alignment system of embodiment 1, wherein the surgical laser system further includes a diffractive optical element for diffracting the laser beam into a plurality of laser beams corresponding to a multi-spot beam pattern.

Embodiment 4: The optical fiber alignment system of embodiment 1, wherein the optical fiber is a multi-core optical fiber having a plurality of cores.

Embodiment 5: The optical fiber alignment system of embodiment 1, wherein redirecting of the laser beam onto the first interface plane at the proximal end of the optical fiber causes the second portion of the laser beam to transmit within a core of the optical fiber and reflect at the second interface plane at the distal end of the optical fiber back to the optical device for redirecting onto the imaging device.

Embodiment 6: The optical fiber alignment system of any of embodiments 1-5, wherein the processor is configured to initiate and cease propagation of the laser beam for imaging of the beam pattern and the core pattern.

Embodiment 7: The optical fiber alignment system of embodiment 1, further comprising a display device in communication with the imaging device and configured to simultaneously display the imaged beam pattern and core pattern.

Embodiment 8: A optical fiber alignment system, including a surgical laser system having a laser source configured to propagate a laser beam, an optical fiber coupled to the surgical laser system through a port, an illumination source configured to propagate an illumination beam through a core of the optical fiber, an imaging device, a memory comprising executable instructions, a processor in data communication with the memory and configured to execute the instructions, which cause the processor to control the laser source, the illumination source, and the imaging device. The surgical laser system further includes an optical relay system configured to direct the laser beam onto a lens of the imaging device for imaging of a beam pattern of the laser beam.

Embodiment 9: The optical fiber alignment system of embodiment 8, wherein the optical relay system includes a diffractive optical element for diffracting the laser beam into a plurality of laser beams corresponding to a multi-spot beam pattern.

Embodiment 10: The optical fiber alignment system of embodiment 8, wherein the optical fiber is a multi-core optical fiber having a plurality of cores.

Embodiment 11: The optical fiber alignment system of any of embodiments 8-9, wherein the processor is configured to initiate propagation of the laser beam for imaging of the beam pattern.

Embodiment 12: The optical fiber alignment system of embodiment 8, further comprising a temporary optical device configured to redirect the illumination beam propagated through the core of the optical fiber onto the lens of the imaging device for imaging of a core pattern of the optical fiber.

Embodiment 13: The optical fiber alignment system of embodiment 12, wherein the processor is configured to cease propagation of the laser beam and initiate propagation of the illumination beam for imaging of the core pattern.

Embodiment 14: The optical fiber alignment system of embodiment 8, further comprising a translation assembly coupled to the imaging device for laterally translating the imaging device between a first position and a second position, and a fixed optical device configured to direct the illumination beam propagated through the core of the optical fiber onto the lens of the imaging device for imaging of a core pattern of the optical fiber when the imaging device is in the second position.

Embodiment 15: The optical fiber alignment system of embodiment 13, wherein the processor is configured to cease propagation of the laser beam, initiate translation of the imaging device from the first position to the second position, and initiate propagation of the illumination beam for imaging of the core pattern.

Embodiment 16: The optical fiber alignment system of embodiment 8, further comprising a display device in communication with the imaging device and configured to display the imaged beam pattern.

Embodiment 17: The optical fiber alignment system of any of embodiments 12-15, further comprising a display device in communication with the imaging device and configured to display the imaged beam pattern and the imaged core pattern.

What is claimed is:

1. A method of aligning a multi-core fiber of a laser device, comprising:
   projecting a laser beam corresponding to a multi-spot laser beam pattern from a laser source onto a sensor;
   projecting a light beam corresponding to a multi-core pattern of the multi-core fiber onto the sensor;
   identifying a rotational misalignment between the multi-spot laser beam pattern and the multi-core pattern; and
   rotating the multi-core fiber based on the identifying to align the multi-spot laser beam pattern and the multi-core pattern;
   wherein identifying the rotational misalignment further comprises:
   locating a center point for each of two imaged cores of the multi-core pattern;
   determining a first axis intersecting the center points of the two imaged cores;
   locating a center point for each of two imaged spots of the multi-spot laser beam;
   determining a second axis intersecting the center points of the two imaged spots; and
   determining an angle between the first axis and the second axis, the angle corresponding to the rotational misalignment between the multi-spot laser beam pattern and the multi-core pattern.

2. The method of claim 1, further comprising:
   increasing a contrast of a luminous exitance between each imaged core and an inter-core region in the multi-core pattern by at least one of adjusting a power of the laser source, reducing an amount of ambient light, reducing a back reflection of the projected laser beams off a distal end of the multi-core fiber, or shrouding an imaging device.

3. The method of claim 1, further comprising:
   determining a degree of rotation of the multi-core fiber to align the multi-spot laser beam pattern and the multi-core pattern.

4. The method of claim 1, wherein the projecting the laser beam further comprises:
   transmitting a single-spot laser beam pattern from the laser source through a diffractive optical element to form the multi-spot laser beam pattern.

5. The method of claim 1, wherein the projecting the light beam further comprises:
   stopping the projection of the laser beam from the laser source;
   after stopping the projection of the laser beam, projecting the light beam onto a distal end of the multi-core fiber, the light beam traveling through the multi-core fiber and forming the multi-core pattern upon exiting a proximal end of the multi-core fiber, wherein the proximal end of the multi-core fiber is coupled to a port of the laser device; and
   deflecting the multi-core pattern onto the sensor via a mirror.

6. The method of claim 1, further comprising:
   transmitting an image of the multi-spot laser beam pattern and an image of the multi-core pattern to a computer; and
   displaying the images of the multi-spot laser beam pattern and the multi-core pattern on a display device.

7. The method of claim 1, wherein the images of the multi-spot laser beam pattern and the multi-core pattern are overlaid to determine the rotational misalignment therebetween.

8. A method of aligning a multi-core fiber of a laser device, comprising:
   projecting a laser beam corresponding to a multi-spot laser beam pattern from a laser source onto a sensor;
   projecting a light beam corresponding to a multi-core pattern of the multi-core fiber onto the sensor;
   identifying a rotational misalignment between the multi-spot laser beam pattern and the multi-core pattern; and
   rotating the multi-core fiber based on the identifying to align the multi-spot laser beam pattern and the multi-core pattern;
   aligning the multi-core fiber with a device adaptor for coupling the multi-core fiber to the laser device, comprising:
   attaching the device adaptor to a port of the laser device, the device adaptor rotationally connected to the multi-core fiber at a proximal end of the multi-core fiber;
   imaging the multi-core pattern of the multi-core fiber onto the sensor;
   locating a center point for each of two imaged cores of the multi-core pattern;
   determining a first axis intersecting the center points of the two imaged cores;
   determining an angle between the first axis and a reference axis corresponding to the device adaptor; and
   rotating the multi-core fiber to align the first axis and the reference axis.

9. The method of claim 2, further comprising:
   increasing a contrast of a luminous exitance between each imaged core and an inter-core region in the multi-core pattern by at least one of adjusting a power of the laser source, reducing an amount of ambient light, reducing a back reflection of the projected laser beams off a distal end of the multi-core fiber, or shrouding an imaging device.

10. The method of claim 2, further comprising:
    determining a degree of rotation of the multi-core fiber to align the multi-spot laser beam pattern and the multi-core pattern.

11. The method of claim 2, wherein the projecting the laser beam further comprises:
    transmitting a single-spot laser beam pattern from the laser source through a diffractive optical element to form the multi-spot laser beam pattern.

12. The method of claim 2, wherein the projecting the light beam further comprises:
    stopping the projection of the laser beam from the laser source;
    after stopping the projection of the laser beam, projecting the light beam onto a distal end of the multi-core fiber, the light beam traveling through the multi-core fiber and forming the multi-core pattern upon exiting a proximal end of the multi-core fiber, wherein the proximal end of the multi-core fiber is coupled to a port of the laser device; and
    deflecting the multi-core pattern onto the sensor via a mirror.

13. The method of claim 2, further comprising:
    transmitting an image of the multi-spot laser beam pattern and an image of the multi-core pattern to a computer; and
    displaying the images of the multi-spot laser beam pattern and the multi-core pattern on a display device.

14. The method of claim 2, wherein the images of the multi-spot laser beam pattern and the multi-core pattern are overlaid to determine the rotational misalignment therebetween.

15. A method of aligning a multi-core fiber with a multi-spot laser source of a device, comprising:
- transmitting a laser beam from the multi-spot laser source through a diffractive optical element to form a multi-spot laser beam;
- deflecting the multi-spot laser beam onto a proximal endface of the multi-core fiber;
- reflecting a first portion of the multi-spot laser beam from the proximal endface of the multi-core fiber, the reflected first portion forming a multi-spot laser beam pattern corresponding to the multi-spot laser beam;
- reflecting a second portion of the multi-spot laser beam from a distal endface of the multi-core fiber, the reflected second portion forming a multi-core pattern corresponding to the cores of the multi-core fiber;
- transmitting the multi-spot laser beam pattern and the multi-core pattern to a sensor;
- identifying a rotational misalignment between the multi-spot laser beam pattern and the multi-core pattern;
- determining a degree of rotation of the multi-core fiber to align the multi-spot laser beam pattern and the multi-core pattern; and
- rotating the multi-core fiber to rotationally align the multi-spot laser beam pattern and the multi-core pattern.

16. The method of claim 15, wherein an image of the multi-spot laser beam pattern and an image of the multi-core pattern are overlaid to determine the rotational misalignment therebetween.

17. The method of claim 15, wherein identifying the rotational misalignment further comprises:
- locating a center point for each of two imaged cores of the multi-core pattern;
- determining a first axis intersecting the center points of the two imaged cores;
- locating a center point for each of two imaged spots of the multi-spot laser beam;
- determining a second axis intersecting the center points of the two imaged spots; and
- determining an angle between the first axis and the second axis.

18. The method of claim 15, further comprising:
- transmitting an image of the multi-spot laser beam pattern and an image of the multi-core pattern to a computer; and
- displaying the images of the multi-spot laser beam pattern and the multi-core pattern on a display device.

19. The method of claim 15, further comprising:
- stopping the transmission of the laser beam from the multi-spot laser source;
- after stopping the transmission of the laser beam, projecting a light beam onto a distal end of the multi-core fiber, the light beam traveling through the multi-core fiber and forming the multi-core pattern upon exiting a proximal end of the multi-core fiber; and
- imaging the multi-core pattern on the sensor.

\* \* \* \* \*